(12) United States Patent
Kozuka et al.

(10) Patent No.: US 10,891,722 B2
(45) Date of Patent: Jan. 12, 2021

(54) DISPLAY METHOD AND DISPLAY DEVICE

(71) Applicant: Panasonic Intellectual Property Corporation of America, Torrance, CA (US)

(72) Inventors: Masayuki Kozuka, Osaka (JP); Takashi Higashida, Hyogo (JP); Yoshihiro Mori, Osaka (JP); Haruyasu Hirakawa, Osaka (JP); Tadamasa Toma, Osaka (JP); Hirokazu Nakanishi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/512,846

(22) Filed: Jul. 16, 2019

(65) Prior Publication Data

US 2019/0340734 A1 Nov. 7, 2019

Related U.S. Application Data

(63) Continuation of application No. 15/795,443, filed on Oct. 27, 2017, now Pat. No. 10,402,953, which is a (Continued)

(30) Foreign Application Priority Data

Dec. 18, 2015 (JP) ................................. 2015-247985

(51) Int. Cl.
*G06T 5/00* (2006.01)
*G09G 5/00* (2006.01)
(Continued)

(52) U.S. Cl.
CPC ................ *G06T 5/009* (2013.01); *G06T 5/50* (2013.01); *G09G 5/00* (2013.01); *G09G 5/10* (2013.01);
(Continued)

(58) Field of Classification Search
None
See application file for complete search history.

(56) References Cited

U.S. PATENT DOCUMENTS 5,768,442 A 6/1998 Ahn
2012/0147068 A1* 6/2012 Gondo ................. G09G 3/3406
345/690

(Continued)

FOREIGN PATENT DOCUMENTS

EP 2 222 087 8/2010
EP 3 043 553 7/2016
(Continued)

OTHER PUBLICATIONS

International Search Report of PCT application No. PCT/JP2016/000627 dated May 10, 2016.
(Continued)

*Primary Examiner* — Samira Monshi
(74) *Attorney, Agent, or Firm* — Wenderoth, Lind & Ponack, L.L.P.

(57) ABSTRACT

Provided is a display method of displaying, on a display device, video of video data where luminance of video is defined by a first EOTF indicating a correlation of HDR luminance and code values. The method includes: acquiring the video data; performing, regarding each of multiple pixels making up the video in the acquired video data, first determining of determining whether luminance of that pixel exceeds a first predetermined luminance; performing, regarding each of the multiple pixels, dual tone mapping
(Continued)

where luminance of that pixel is reduced by a different format in a case of the luminance of the pixel being found to exceed the first predetermined luminance from the first determining, and a case of the luminance of the pixel being found to be equal to or lower than the first predetermined luminance; and displaying the video on the display device using the results of the dual tone mapping.

8 Claims, 31 Drawing Sheets

Related U.S. Application Data continuation of application No. PCT/JP2016/000627, filed on Feb. 8, 2016.

(60) Provisional application No. 62/166,169, filed on May 26, 2015.

(51) Int. Cl.
| | | |
|---|---|---|
| G09G 5/10 | (2006.01) | |
| H04N 9/69 | (2006.01) | |
| H04N 21/431 | (2011.01) | |
| H04N 21/435 | (2011.01) | |
| G06T 5/50 | (2006.01) | |

(52) U.S. Cl.
CPC ............ *H04N 9/69* (2013.01); *H04N 21/431* (2013.01); *H04N 21/435* (2013.01); *G06T 2207/10016* (2013.01); *G06T 2207/10024* (2013.01); *G06T 2207/20208* (2013.01); *G09G 2320/0613* (2013.01); *G09G 2320/0673* (2013.01); *G09G 2360/16* (2013.01); *G09G 2370/12* (2013.01)

(56) References Cited

U.S. PATENT DOCUMENTS

| | | | |
|---|---|---|---|
| 2014/0225941 A1 | 8/2014 | Van der Vleuten | |
| 2015/0103919 A1 | 4/2015 | Hattori et al. | |

FOREIGN PATENT DOCUMENTS

| | | |
|---|---|---|
| JP | 2008-167418 | 7/2008 |
| WO | 2015/034188 | 3/2015 |
| WO | 2016/038775 | 3/2016 |

OTHER PUBLICATIONS

Paul Lauga et al., "Segmentation-based optimized tone mapping for high dynamic range image and video coding", 2013 Picture Coding Symposium Proceedings, ISBN 978-1-4799-0292-7, Dec. 8, 2013, pp. 257-260.
Extended European Search Report dated May 9, 2018 in European Application No. 16799494.6.

\* cited by examiner

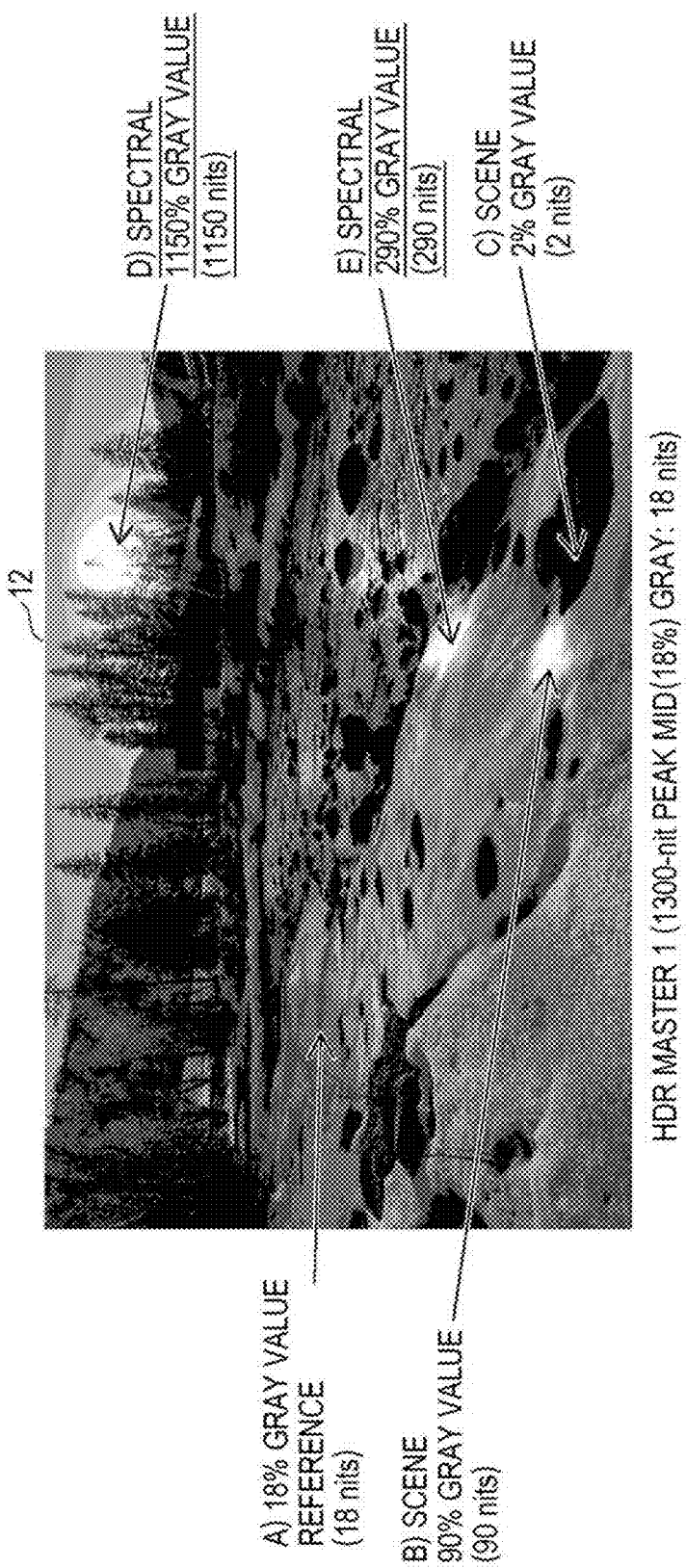

FIG. 12

| | GRADING PRINCIPLES | HDR AND SDR COMPATIBILITY | MASTER MONITOR | FEATURES OF HDR IMAGE |
|---|---|---|---|---|
| DOLBY VISION FORMAT | ■ MASTER MONITOR DEPENDENT, ABSOLUTE LUMINANCE MANAGEMENT GRADING IS PERFORMED AT ABSOLUTE LUMINANCE IN ACCORDANCE WITH DISPLAY CAPABILITIES OF MASTER MONITOR, AND GRADED DATA IS STORED IN PQ SPACE (SPMTE ST2084). | AFTER GENERATING HDR SIGNALS, DIVIDE INTO PORTIONS OF SDR SIGNALS 100 nits OR LOWER, AND AUXILIARY SIGNALS FOR REPLICATION OF HDR. HDR SIGNALS = GENERATED SDR SIGNALS + AUXILIARY SIGNALS (DIFFERENCE) | USUALLY, DISPLAY DEVICE CALLED PULSAR THAT HAS EXTREMELY HIGH MAXIMUM LUMINANCE (4000 nits) IS USED | ■ BAND AROUND 80 nits AND LOWER IS ALMOST COMMON BETWEEN SDR/HDR. FOR COMPATIBILITY BETWEEN HDR AND SDR. ACCORDINGLY, MIDDLE GRAY POINT ALSO IN COMMON. ONLY DIFFERENCE IS HIGH-LUMINANCE PORTION AT OR ABOVE 80 nits. ■ MAXIMUM LUMINANCE IS EXTREMELY HIGH, AT 2000 TO 4000 |
| FORMAT SIMILAR TO SDR (DEPENDENT ON MASTER MONITOR) | | NO COMPATIBILITY WITH SDR. SDR IS GENERATED BY GRADING SEPARATELY | USUALLY, STANDARD DISPLAY DEVICE THAT HAS MAXIMUM LUMINANCE EQUIVALENT TO 1000 nits IS USED (E.G., SONY X300 OR HIGH-END CONSUMER TV, ETC.) | ■ FEATURES CURRENTLY SIMILAR TO DV FORMAT ■ SAVE THAT MAXIMUM LUMINANCE IS AROUND 800 TO 1000 |
| ACES FORMAT (ACES: ACADEMY COLOR ENCODING SYSTEM) | ■ MASTER MONITOR NON-DEPENDENT, RELATIVE LUMINANCE MANAGEMENT GRADING IS PERFORMED INDEPENDENTLY FROM DISPLAY CAPABILITIES OF MASTER MONITOR, AND GRADING INFORMATION IS STORED BY FLOATING DECIMAL POINT (RELATIVE LUMINANCE). | RELATIVE LUMINANCE MANAGEMENT IS PERFORMED BY ACES, SO CONVERSION TO HDR AND SDR IS AUTOMATICALLY PERFORMED WHILE MAINTAINING RELATIVE RELATIONSHIP OF LUMINANCE, THEREBY GENERATING SDR (100 nits) AND OPTIONAL MAXIMUM-LUMINANCE HDR (E.G., 1000 nits) | | ■ AUTOMATICALLY CONVERTED FROM RELATIVE-LUMINANCE-MANAGED INFORMATION IN ACCORDANCE WITH MAXIMUM LUMINANCE OF HDR. ACCORDINGLY, ABSOLUTE VALUES GREATLY DIFFER BETWEEN SDR AND HDR, BUT RELATIVE RELATIONSHIP IS MAINTAINED. THERE ARE CASES WHERE MIDDLE GRAY POINT IS HIGHER. ■ MAXIMUM LUMINANCE IS AROUND 800 TO 1000 |

FIG. 25

| | PROBLEMS FOR HDR TV |
|---|---|
| DOLBY VISION FORMAT | ■ SAME AS SDR AT 100 nits OR LOWER, PROCESSING SIMILAR TO OTHER FORMATS CAN BE PERFORMED UP TO AROUND 1000 nits<br>■ MAXIMUM LUMINANCE UP TO AROUND 4000 nits, SPECIAL PROCESSING FOR HIGH LUMINANCE NECESSARY AT 1000 nits AND ABOVE. |
| FORMAT SIMILAR TO SDR (DEPENDENT ON MASTER MONITOR) | ■ MAXIMUM LUMINANCE AROUND 800 TO 1000, NO SPECIAL PROCESSING FOR HIGH LUMINANCE NECESSARY.<br>■ 1000 nits AND LOWER CAN BE HANDLED BY STANDARD KNEE PROCESSING |
| ACES FORMAT (ACES: ACADEMY COLOR ENCODING SYSTEM) | ■ MAXIMUM LUMINANCE AROUND 800 TO 1000 IN MANY CASES, NO SPECIAL PROCESSING FOR HIGH LUMINANCE NECESSARY.<br>■ SAME PROCESSING AS CONVENTIONAL FORMAT IN CASE WHERE 18% GRAY DOES NOT CHANGE<br>■ FORMAT TAKING RELATIVE RELATION INTO CONSIDERATION NECESSARY IN CASE WHERE 18% GRAY POINT HAS BEEN MOVED. |

DISPLAY METHOD AND DISPLAY DEVICE

BACKGROUND

1. Technical Field

The present invention relates to a display method and a display device.

2. Description of the Related Art

There conventionally has been disclosed an image signal processing device to improve the luminance level that can be displayed (e.g., Japanese Unexamined Patent Application Publication No. 2008-167418).

However, the above Japanese Unexamined Patent Application Publication No. 2008-167418 has needed further improvement.

SUMMARY

In one general aspect, the techniques disclosed here feature a display method of displaying, on a display device, video of video data where luminance of video is defined by a first electro-optical transfer function (EOTF) indicating a correlation of high dynamic range (HDR) luminance and code values. The method includes: acquiring the video data; performing, regarding each of a plurality of pixels making up the video included in the acquired video data, first determining of determining whether or not luminance of that pixel exceeds a first predetermined luminance; performing, regarding each of the plurality of pixels, dual tone mapping where luminance of that pixel is reduced by a different format in a case of the luminance of the pixel being found to exceed the first predetermined luminance as a result of the first determining, and a case of the luminance of the pixel being found to be equal to or lower than the first predetermined luminance; and displaying the video on the display device using the results of the dual tone mapping.

General or specific embodiments may be implemented as a device, a system, an integrated circuit, a computer program, or a computer-readable recording medium such as a Compact Disc Read-Only Memory (CD-ROM) or the like, and may also be implemented as any selective combination of a device, a system, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10A is a diagram illustrating an example of luminance as a result of having mastered the original image illustrated in FIG. 7 to an HDR image;

FIG. 12 is a table describing grading formats;

FIG. 25 is a table describing issues with three grading formats; and

FIG. 26 is a diagram illustrating an example of connecting an HDR-capable Ultra HD Blu-ray (a registered trademark) device to an HDR TV via HDR-capable HDMI (a registered trademark) 2.0a.

DETAILED DESCRIPTION

Underlying Knowledge Forming Basis of the Present Disclosure

The present inventor has found that the following problems occur with regard to the image signal processing device described in the Background Art section. The image signal processing device disclosed in Japanese Unexamined Patent Application Publication No. 2008-167418 calculates linear luminance for each pixel based on linear RGB values calculated from a pixel making up a subject, based on the linear RGB values and linear luminance calculates a corrected linear value of each pixel based on the linear RGB value and linear luminance, and a corrected linear RGB value of a composited pixel of multiple pixels including the pixel, and performs gamma correction of the corrected linear luminance and corrected linear RGB values to calculate a display luminance and display RGB values. Thus, the number of expressible gradients is increased in the image signal processing device by correcting the linear luminance based on the corrected linear RGB values.

In recent years, as a result of advance in video technology, there is known a technology of displaying HDR video, where luminance has been defined in HDR that is a broader dynamic range than the dynamic range in which convention video has defined luminance, on a display device such as a TV. Change in video technology will be described with reference to FIG. 1.

Figure 1:
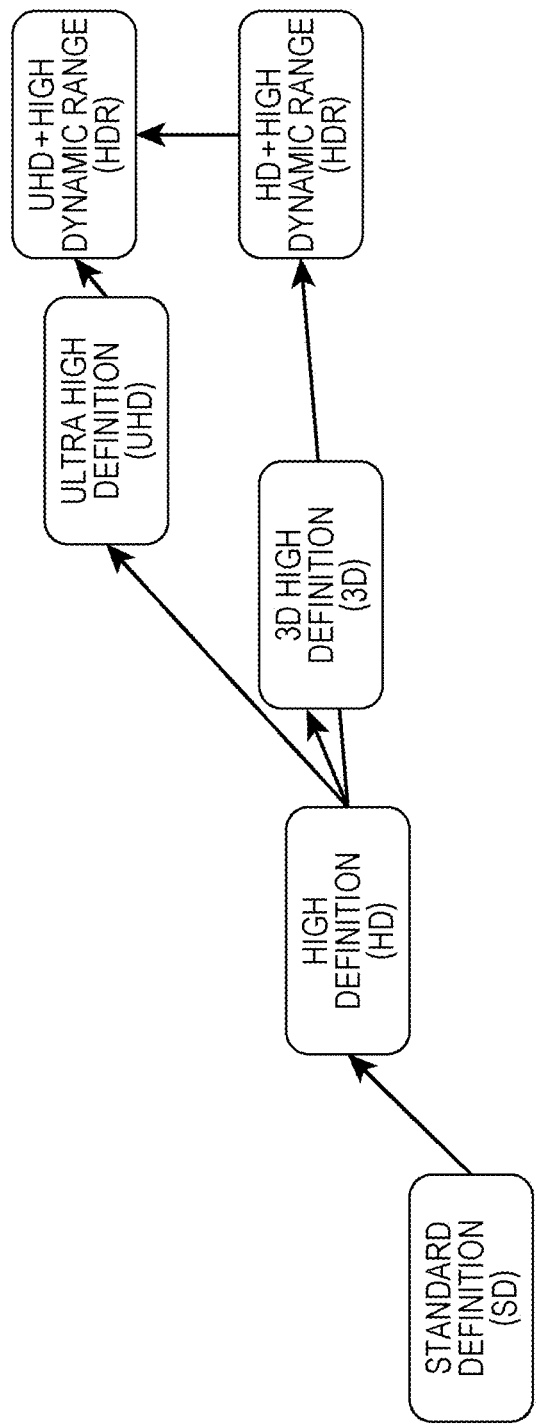
FIG. 1 is a diagram for describing advance in video technology.

FIG. 1 is a diagram for describing evolution of video technology. Heretofore, primary focus in increasing image quality of video has primarily focused on more display pixels, and Standard Definition (SD) video that has 720×480 pixels through High Definition (HD) so-called 2K video that has 1920×1080 pixels are in widespread use.

As of recent, introduction has started of Ultra High Definition (UHD) video that has 3840×1920 pixels, and so-called 4K video that has 4096×1920, for even higher image quality. Raising image equality of video by expanding the dynamic range and broadening the color gamut, or addition, improvement, etc., of frame rates, in addition to high resolution of video by the introduction of 4K, is being studied.

With regard to expanding the dynamic range, improved performance of digital cameras and complementary metal-oxide-semiconductor (CMOS) image sensors now enables shooting of images with a broad dynamic range of 14 stops or more, for the number of stops representing exposure. Accordingly, shooting can be performed of light that is 100% reflected light or brighter (bright light such as mirror reflection light or the like), while maintaining gradients at dark portions. HDR is being noted as a signal standard that enables transmission of signals with even higher luminance, in order to exploit the improved performance of such cameras and image sensors for improvement in expression.

TV signals heretofore have been referred to as SDR and have a peak luminance (maximum luminance) of 100 nits, while in the case of HDR (particularly HDR encoded by ST 2084 (PQ curve) that is an EOTF standardized by the Society of Motion Picture and Television Engineers (SMPTE), peak luminance of 10,000 nits or higher can now be expressed. Specific applications of HDR are assumed to be broadcasting, packaged media (Blu-ray (a registered trademark) disc, etc.), Internet distribution, and so forth, in the same way as with HD and UHD.

Figure 2:
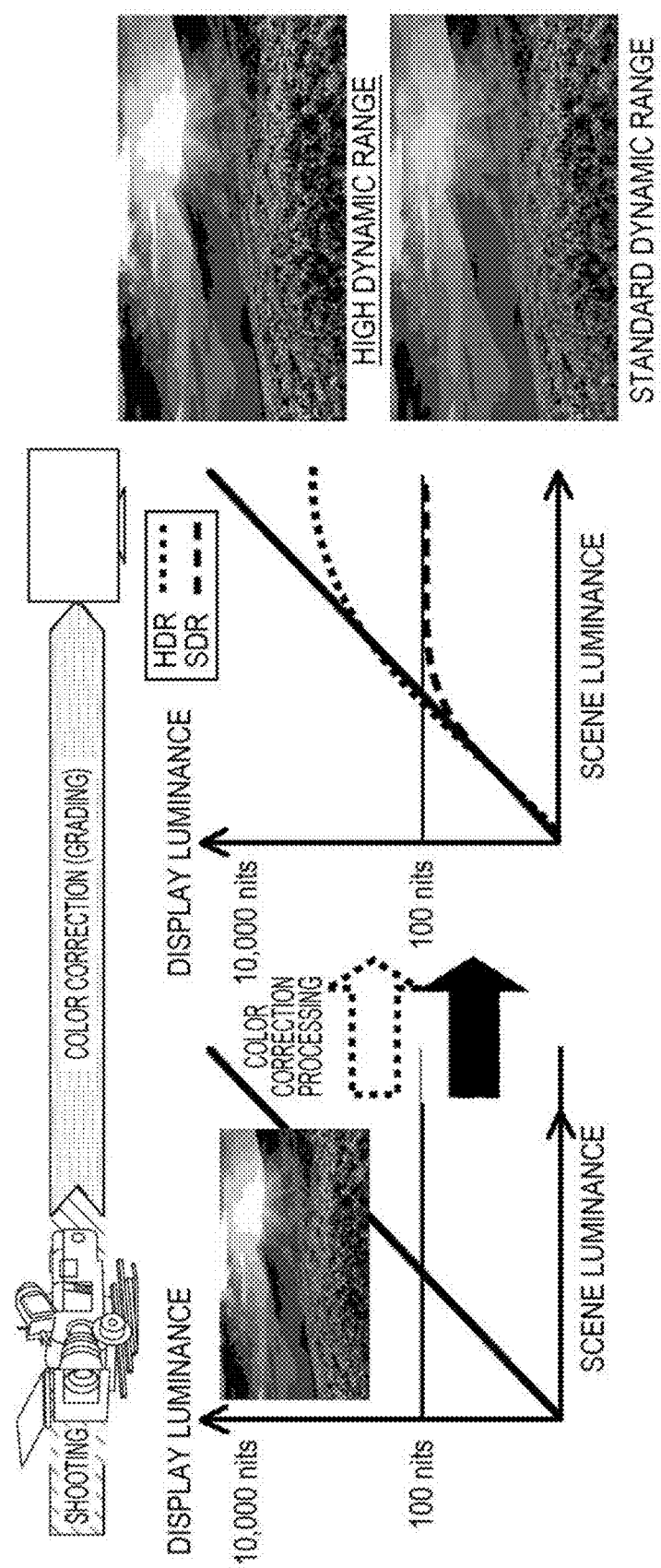
FIG. 2 is a diagram for describing the difference between standard dynamic range (SDR) signals and HDR signals.

Next, SDR and HDR will be described with reference to FIG. 2. FIG. 2 is a diagram for describing the difference between SDR signals and HDR signals. Note that SDR signals are video signals indicating SDR video corresponding to SDR, and HDR signals are video signals indicating HDR video corresponding to HDR.

Original signals obtained by shooting with a digital camera having a broad dynamic range (14 stops, etc.) contain luminance information over the broad range of 0 to 10,000 nits. SDR signals are video satisfying a broadcast standard such as bt709 or the like, and are video signals obtained by color correction processing (grading) to yield SDR video with a peak luminance of 100 nits from original signals. That is to say, SDR signals are video signals where the luminance of the video is defined by a dynamic range of 0 to 100 nits in luminance.

On the other hand, HDR signals are video signals obtained by color correction processing (grading) to yield HDR video with a maximum luminance up to 10,000 nits for the dynamic range of luminance, to match the restrictions of ST 2084 (hereinafter referred to as "PQ curve"), where the restrictions of peak luminance of 100 nits such as in SDR signals have been eliminated. That is to say, HDR signals are video signals where the luminance of the video is defined by a dynamic range of 0 to 10000 nits in luminance. Note that the maximum luminance of the dynamic range of luminance for HDR signals is not restricted to 10,000 nits, and may be 800 to 4000 nits, for example.

Thus, the dynamic range of luminance in HDR is a dynamic range that has a greater peak luminance than the dynamic range of luminance in SDR. Note that the minimum luminance of the dynamic range of luminance in HDR is the same as the minimum luminance of the dynamic range of luminance in SDR, which is 0 nits.

Figure 3:
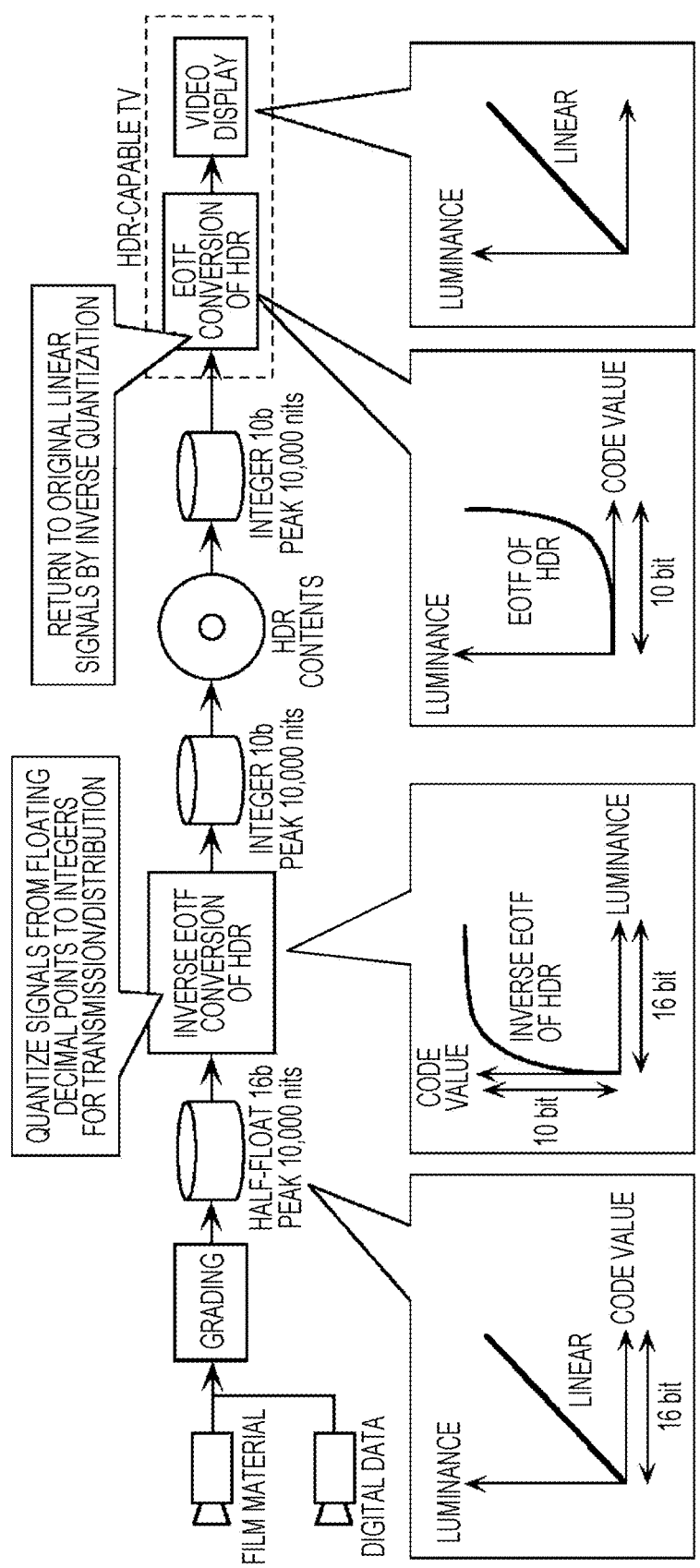
FIG. 3 is an explanatory diagram of a method for deciding code values for luminance signals stored in contents, and a process of restoring luminance from code values at the time of playback.

FIG. 3 is an explanatory diagram of a method for deciding code values for luminance signals stored in contents, and a process of restoring luminance from code values at the time of playback. The video signals in this example are HDR signals corresponding to HDR. Following grading, an image is quantized by inverse EOTF conversion of HDR, and code values corresponding to the luminance of the image are decided. Image encoding and so forth is performed based on the code values, and a video stream is generated. At the time of playback, the decoded results of the stream are converted into linear signals by performing inverse quantization based on EOTF of HDR, thereby restoring the luminance for each pixel. Hereinafter, quantization using inverse EOTF of HDR will be referred to as "HDR inverse EOTF conversion". Inverse quantization using EOTF of HDR will be referred to as "HDR EOTF conversion". In the same way, quantization using inverse EOTF of SDR will be referred to as "SDR inverse EOTF conversion". Inverse quantization using EOTF of SDR will be referred to as "SDR EOTF conversion".

In a case of performing display control where HDR signals are displayed using an HDR-capable display device (e.g., an HDR TV) as described above, the displayable peak luminance (hereinafter referred to as "display peak luminance") of the HDR TV is often lower than the peak luminance of the HDR signals. Accordingly, there is a need for the dynamic range of the luminance of the HDR signals to be compressed to the dynamic range of the luminance which the HDR TV can handle, so that the peak luminance of the HDR signals match the display peak luminance of the HDR TV.

However, the luminance correction (conversion) such as that performed by the image signal processing device disclosed in Japanese Unexamined Patent Application Publication No. 2008-167418 did not take into consideration a conversion method for luminance when correcting (converting) luminance to a dynamic range of luminance narrower than the dynamic range of luminance in HDR where video luminance is defined. This has led to the following problem.

Due to the difference between EOTF for SDR (gamma curve: relative luminance reference) and EOTF for HDR (ST 2084: PQ curve: absolute luminance reference), there has been the following problem when displaying HDR signals on an HDR TV, unlike the case of displaying SDR signals on an SDR-capable display device (e.g., an SDR TV). International standardization organizations for audio visual (AV) technology, such as the Blu-ray (a registered trademark) Disc Association, UHD Alliance, and so forth, are requiring that HDR-capable contents be graded with a predetermined luminance smaller than 10,000 nits (e.g., 1000 nits) as the upper limit, for the time being (luminances above this also permissible).

Figure 4:
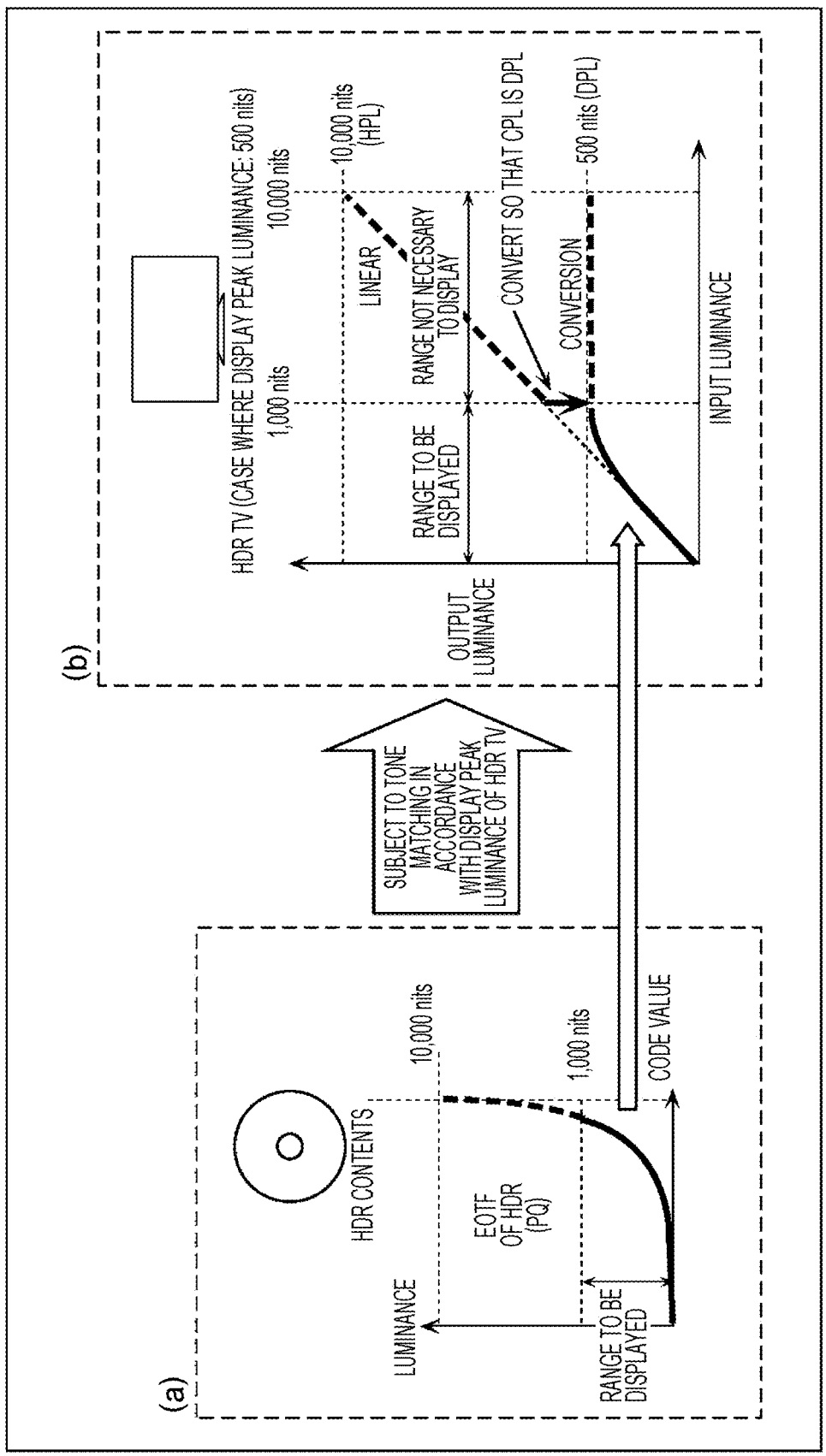
FIG. 4 is a diagram for describing an example of display processing, in a case of displaying HDR signals on an HDR TV.

FIG. 4 is a diagram for describing an example of display processing in a case of displaying HDR signals on an HDR TV. The (a) in FIG. 4 is a diagram illustrating EOTF of HDR where luminance of HDR content video is defined. The (b) in FIG. 4 is a diagram illustrating tone mapping processing (luminance conversion processing) for converting luminance of HDR contents in accordance with peak luminance of an HDR TV.

In a case of displaying HDR video defined by a dynamic range having a predetermined luminance (e.g., 1000 nits) as the peak luminance, on an HDR TV of which the display peak luminance is smaller than the predetermined luminance (e.g., 500 nits), the HDR TV is required to express the predetermined luminance that is the peak luminance of the HDR video, by predetermined tone mapping processing being performed on the HDR signals of the HDR video, as illustrated in FIG. 4. That is to say, performing tone mapping processing to match the predetermined luminance to the display peak luminance of the HDR TV is required, so that the peak luminance of the HDR video can be expressed on the HDR TV.

In this case, if the luminance component is all that matters, the luminance of the video can be converted to match the display peak luminance of the HDR TV by performing tone mapping including knee curve processing using a knee curve that shows the relationship between input luminance and output luminance, as illustrated in (b) in FIG. 4. However, in a case of applying equivalent knee curve processing independently to the value of each RGB color of the video signals, there is concern that color change might occur.

In predetermined tone mapping processing, there is need to perform equivalent independently to each RGB color value, so that color does not change. In a case where the color of one pixel that is the object of predetermined tone mapping processing is configured of values of each RGB color situated spanning the point of knee curve, the RGB balance after the predetermined tone mapping processing will be lost, and the color will change before and after tone mapping processing. That is to say, if a first color of RGB (e.g., R) is a value corresponding to a luminance in a luminance range to which a knee curve is not applied, and a second color of RGB (e.g., B) that differs from the first color of RGB is a value corresponding to a luminance in a luminance range to which a knee curve is applied, luminance does not change regarding the value of the first color corresponding to the luminance in the luminance range to which the knee curve is not applied, so there is hardly any effect on the value of the first color, but luminance slightly changes regarding the value of the second color corresponding to the luminance in the luminance range to which the knee curve is applied, so the value of the second color also changes. Accordingly, the relative relationship among the values of the RGB colors is lost between before and after the predetermined tone mapping processing, and change of color occurs. Even if the value of each RGB color is a luminance within the luminance range where the knee curve is applied, the rate of change where the luminance is reduced in accordance with the magnitude of luminance is different in the luminance range where the knee curve is applied, so the relative relationship among the values of the RGB colors is lost. Accordingly, complex three-dimensional color conversion processing and so forth has been necessary in order to reduce change in color between before and after the predetermined tone mapping processing.

That is to say, in a case of HDR contents graded using a high-luminance master monitor (e.g., Dolby Vision) for grading absolute-luminance reference HDR contents, there are pixels that are valid at ranges equal to or above 1000 nits. Accordingly, there has been concern that the tone mapping processing, where knee curve processing is performed to clip at 1000 nits as illustrated in FIG. 4, might not be able to correctly reproduce the color of pixels having luminance equal to or above 1000 nits.

Figure 5:
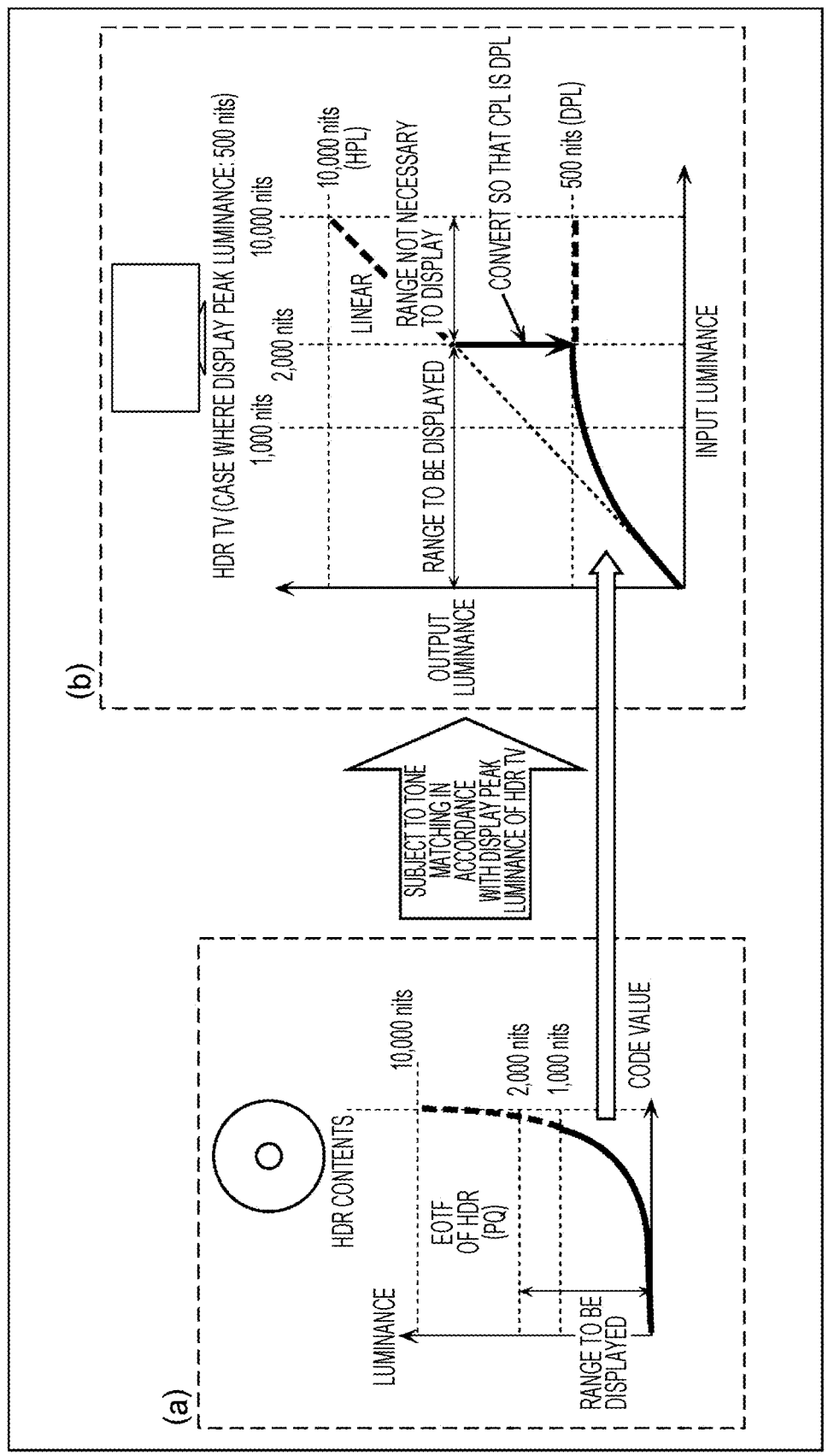
FIG. 5 is a diagram for describing an example of display processing, in a case of displaying HDR signals of HDR contents, graded at a high-luminance master monitor, on an HDR T.

FIG. 5 is a diagram for describing an example of display processing, in a case of displaying HDR signals of HDR contents, graded at a high-luminance master monitor, on an HDR TV. The (a) in FIG. 5 is a diagram illustrating EOTF of HDR where the luminance of video of HDR contents is defined. The (b) in FIG. 5 is a diagram illustrating tone mapping processing (luminance conversion processing) for converting luminance of HDR contents in accordance with display peak luminance of an HDR TV.

As illustrated in FIG. 5, peak luminance of 2000 nits, for example, can be had in the case of HDR contents graded using a high-luminance master monitor. In a case of displaying such HDR video of HDR contents having a peak luminance of 2000 nits on an HDR TV of which the display peak luminance is smaller than 2000 nit (e.g., 500 nit), it is required to express the 2000-nit peak luminance of the HDR video on the HDR TV by performing tone mapping processing including the knee curve processing such as illustrated in FIG. 5.

In a case of simply performing the tone mapping processing in the same way as in FIG. 4, the range that can be linearly display will be extremely narrow, since luminance up to 2000 nits is kept within 500 nits. That is to say, there has been a problem in that, while the region of 1000 to 2000 nits is expressible in comparison with FIG. 4, for example, reproducibility of luminance 1000 nits and lower is poorer as compared to the luminance up to 1000 nits such as illustrated in FIG. 4.

Also, video having luminance exceeding a predetermined high luminance such as 1000 nits for example, is video of lightning, fireworks, light bulbs, flames, explosions, the sun, reflections off water, and so forth, called sparkles, and is video of a small region as to the entire video (image). Such video often is white or unicolor. Accordingly, it is necessary to express the video by performing processing regarding pixels having luminance exceeding the predetermined high-luminance taking into consideration the characteristics that the video made up of these pixels is a small region and often is white or unicolor, and performing processing regarding luminance at or below the predetermined high luminance the same as the processing in FIG. 4 as much as possible.

In light of the above studies, the present inventor has studied the following improvements to solve the above problem.

A display method according to an aspect of the present disclosure is a display method of displaying, on a display device, video of video data where luminance of video is defined by a first EOTF indicating a correlation of HDR luminance and code values. The method includes: acquiring the video data; performing, regarding each of a plurality of pixels making up the video included in the acquired video data, first determining of determining whether or not luminance of that pixel exceeds a first predetermined luminance; performing, regarding each of the plurality of pixels, dual tone mapping where luminance of that pixel is reduced by a different format in a case of the luminance of the pixel being found to exceed the first predetermined luminance as a result of the first determining, and a case of the luminance of the pixel being found to be equal to or lower than the first predetermined luminance; and displaying the video on the display device using the results of the dual tone mapping.

According to this, dual tone mapping where luminance is reduced, is performed by a different format in a case of luminance exceeding the first predetermined luminance and luminance equal to or lower than the first predetermined luminance, so the color of the pixels can be suppressed from changing between before and after conversion of luminance.

In the dual tone mapping, each of the plurality of pixels may be subjected to YUV space tone mapping where luminance of that pixel defined by YUV space is reduced, in a case where the luminance of that pixel exceeds the first predetermined luminance, and RGB space tone mapping where the value of each RGB color of that pixel defined by RGB space is reduced, in a case where the luminance of that pixel equal to or lower than the first predetermined luminance.

According to this, with regard to a plurality of pixels included in HDR video of HDR contents, YUV space tone mapping is performed in a case where the luminance of the pixel exceeds the first luminance, so the color of the pixel can be suppressed from changing between before and after conversion of luminance. Also, with regard to a plurality of pixels included in HDR video of HDR contents, RGB space tone mapping is performed in a case where the luminance of the pixel is at or below the first predetermined luminance, so reproducibility of color of each pixel can be maximally maintained between before and after the luminance conversion processing.

The video data may include static metadata. Second determining may be performed of determining whether luminance of the video included in the video data is absolute-luminance managed or relative-luminance managed, based on the static metadata included in the acquired video data. In a case where the luminance of the video included in the video data is found to be absolute-luminance managed as a result of the second determination, the dual tone mapping may be performed. In a case where the luminance of the video included in the video data is found to be relative-luminance managed as a result of the second determination, each of a plurality of pixels making up the video included in the video data may be subjected to RGB tone mapping, where the value of each RGB color defined by RGB space for that pixel is reduced.

According to this, determination is made regarding whether luminance of the video included in the video data is absolute-luminance managed or relative-luminance managed, so tone mapping processing can be appropriately selected in accordance with whether absolute-luminance managed or relative-luminance managed. Accordingly, appropriate processing can be performed regardless of whether absolute-luminance managed video or relative-luminance managed video, so appropriate video can be displayed.

The video data may include information of ST 2086 as the static metadata. In the second determining, whether or not characteristics, included in the information of ST 2086, regarding a master monitor used to generate a master video serving as a base for generation of the video data, are close to characteristics of a predetermined master monitor used to generate absolute-luminance managed video may be determined, with luminance of video of the video data being determined to be absolute-luminance managed in a case of determining that the characteristics of the master monitor are close to characteristics of the predetermined master monitor, and luminance of video of the video data being determined to be relative-luminance managed in a case of determining that the characteristics of the master monitor are not close to characteristics of the predetermined master monitor.

Accordingly, whether luminance of the video is absolute-luminance managed or relative-luminance managed can be easily determined.

In the second determining, whether or not the characteristics of the master monitor are close to characteristics of the predetermined master monitor may be determined by determining, based on display peak luminance information indicating a display peak luminance of the master monitor as the master monitor characteristics, whether or not the display peak luminance is a value near 4000 nits, with luminance of video of the video data being determined to be absolute-luminance managed in a case the display peak luminance is a value near 4000 nits, and luminance of video of the video data being determined to be relative-luminance managed in a case the display peak luminance is not a value near 4000 nits.

Accordingly, whether luminance of the video is absolute-luminance managed or relative-luminance managed can be easily determined.

In the second determining, whether or not the characteristics of the master monitor are close to characteristics of the predetermined master monitor may be determined by determining, based on display primary color information representing display primary color of the master monitor as the master monitor characteristics, whether or not the display primary color is a value near the display primary color of the predetermined master monitor, with the luminance of video of the video data being determined to be absolute-luminance managed in a case the display primary color is a value near the display primary color of the predetermined master monitor, and luminance of video of the video data being determined to be relative-luminance managed in a case the display primary color is not a value near the display primary color of the predetermined master monitor.

Accordingly, whether luminance of the video is absolute-luminance managed or relative-luminance managed can be easily determined.

In the second determining, whether or not the characteristics of the master monitor are close to characteristics of the predetermined master monitor may be determined by determining, based on white point information representing a white point of the master monitor as the master monitor characteristics, whether or not the white point is a value near the white point of the predetermined master monitor, with luminance of video of the video data being determined to be absolute-luminance managed in a case the white point is a value near the white point of the predetermined master monitor, and luminance of video of the video data being determined to be relative-luminance managed in a case the white point is not a value near the white point of the predetermined master monitor.

Accordingly, whether luminance of the video is absolute-luminance managed or relative-luminance managed can be easily determined.

The video data may include peak luminance information representing peak luminance of the video. In the second determining, whether or not the peak luminance represented by the peak luminance information exceeds a second predetermined luminance may be determined, with luminance of video of the video data being determined to be absolute-luminance managed in a case the peak luminance exceeds the second predetermined luminance, and luminance of video of the video data being determined to be relative-luminance managed in a case the peak luminance is equal to or below the second predetermined luminance.

Accordingly, whether luminance of the video is absolute-luminance managed or relative-luminance managed can be easily determined.

The video data may include maximum frame-average luminance information representing maximum frame-average luminance that is a maximum value of average luminance of each of a plurality of frames making up the video. In the second determining, whether or not the maximum frame-average luminance represented by the maximum frame-average luminance information exceeds a third predetermined luminance may be determined, with luminance of video of the video data being determined to be absolute-luminance managed in a case the maximum frame-average luminance exceeds the third predetermined luminance, and luminance of video of the video data being determined to be relative-luminance managed in a case the maximum frame-average luminance is equal to or below the third predetermined luminance.

Accordingly, whether luminance of the video is absolute-luminance managed or relative-luminance managed can be easily determined.

Note that these general or specific embodiments may be implemented as a device, a system, an integrated circuit, a computer program, or a computer-readable recording medium such as a CD-ROM or the like, and may also be implemented as any selective combination of a device, a system, an integrated circuit, a computer program, and a recording medium.

A display method and display device according to an aspect of the present disclosure will be described below in detail with reference to the attached drawings.

Note that the embodiments described below are each general or specific examples of the present disclosure. Values, shapes, materials, placements and connected states of components, steps, order of steps, and so forth, illustrated in the following embodiments, are only exemplary, and do not restrict the present disclosure. Components in the following embodiments which are not included in an independent Claim indicating the highest concept are described as being optional components.

The present disclosure relates to an HDR signal format, a display method of the HDR signals, and a display device, to realize display of HDR signals that are high luminance signals with a high dynamic range, encoded by the SMPTE ST 2084 standard EOTF (hereinafter referred to as "PQ curve"), on a display device (e.g., TV, projector, tablet, smartphone, etc.) that has different display capabilities of dynamic range of luminance from the peak luminance (maximum luminance or highest luminance) in the dynamic range of luminance that the HDR signals correspond to.

First Embodiment

A first embodiment will be described below with reference to FIGS. 6 through 11. First, the flow of processing from shooting an image up to displaying the image on a display unit will be described in order by way of FIGS. 6 through 10B.

1-1. Idea of Scale of Luminance when Shooting Images

Figure 6:
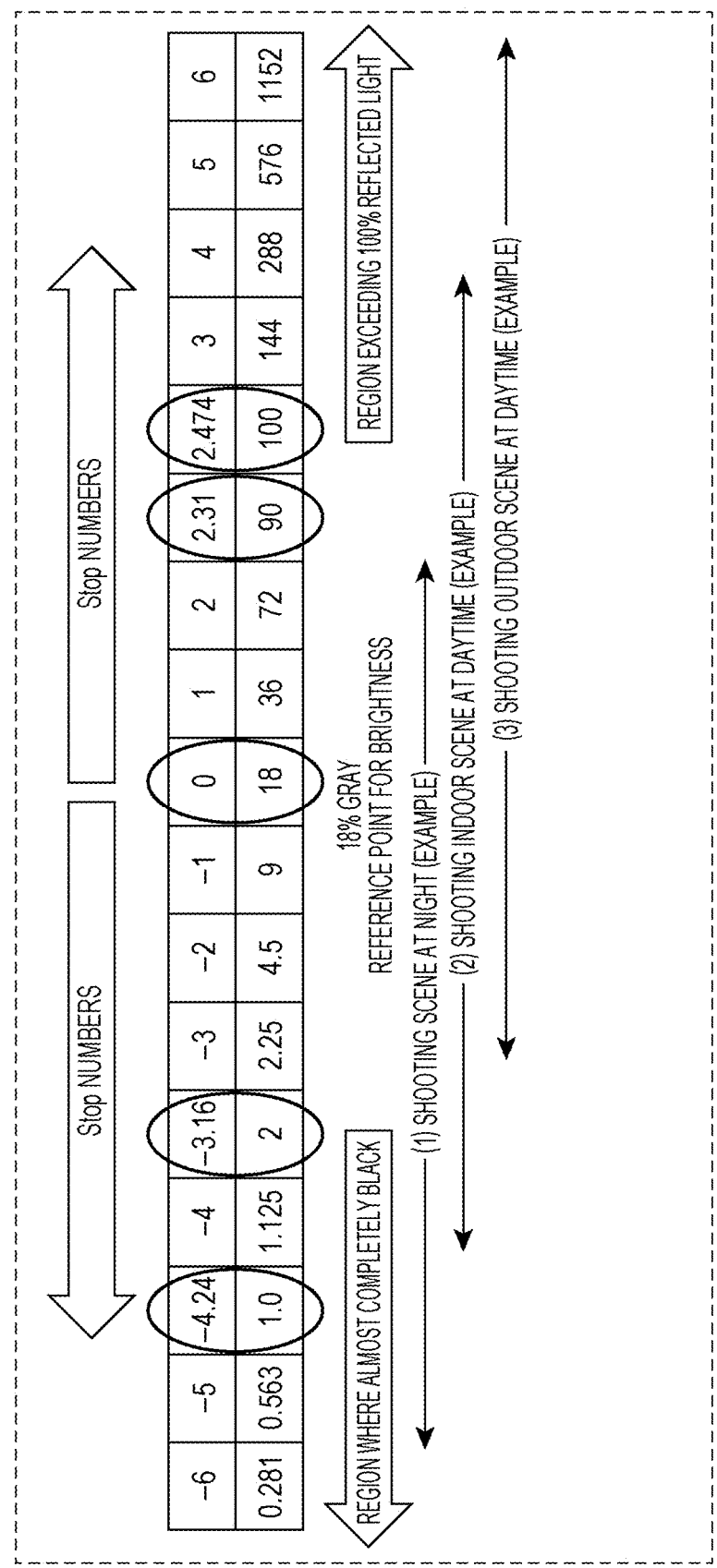
FIG. 6 is a diagram illustrating a scale for luminance when shooting images.

FIG. 6 is a diagram illustrating a scale for luminance when shooting images. It can be seen from FIG. 6 that in a case of shooting an image with a camera, 18% gray, which is gray where the reflectance is 18%, is used as a reference point of brightness for shooting. That is to say, 18% gray is a reference reflectance serving as a reference of brightness. Stop numbers are defined increasing by one each time the luminance doubles, with the luminance at 18% gray as the reference point.

When actually shooting images with a camera, the luminance obtained by the image sensor (e.g., CMOS, charge-coupled device (CCD), etc.) of the camera changes in accordance with change in exposure due to aperture, shutter speed, sensitivity settings, and so forth. That is to say, even of subjects with the same brightness are shot, the luminance obtained from the image sensor will be different values depending on the exposure. Accordingly, the Stop number values themselves are not absolute values, but relative values. That is to say, luminance cannot be expressed by Stop numbers.

For example, in a case of a night scene of (1) in FIG. 6, in order to avoid clipped blacks, exposure is changed by reducing the shutter speed, increasing the aperture, etc., thereby setting the exposure at the camera so as to retain the gradients at dark portions while abandoning bright portions.

In the case of shooting an indoor scene at daytime of (2) in FIG. 6, the exposure is set at the camera so that the balance between dark portions and bright portions is good. In the case of shooting an outdoor scene at daytime of (3) in FIG. 6, exposure settings are made at the camera with reduced exposure to prevent white clipping at bright portions.

Thus, there has been the need to calculate the relative relationship as to 18% gray, in order to convert the relative luminance obtained in this way into an absolute luminance.

1-2. Luminance when Shooting Image

Figure 7:
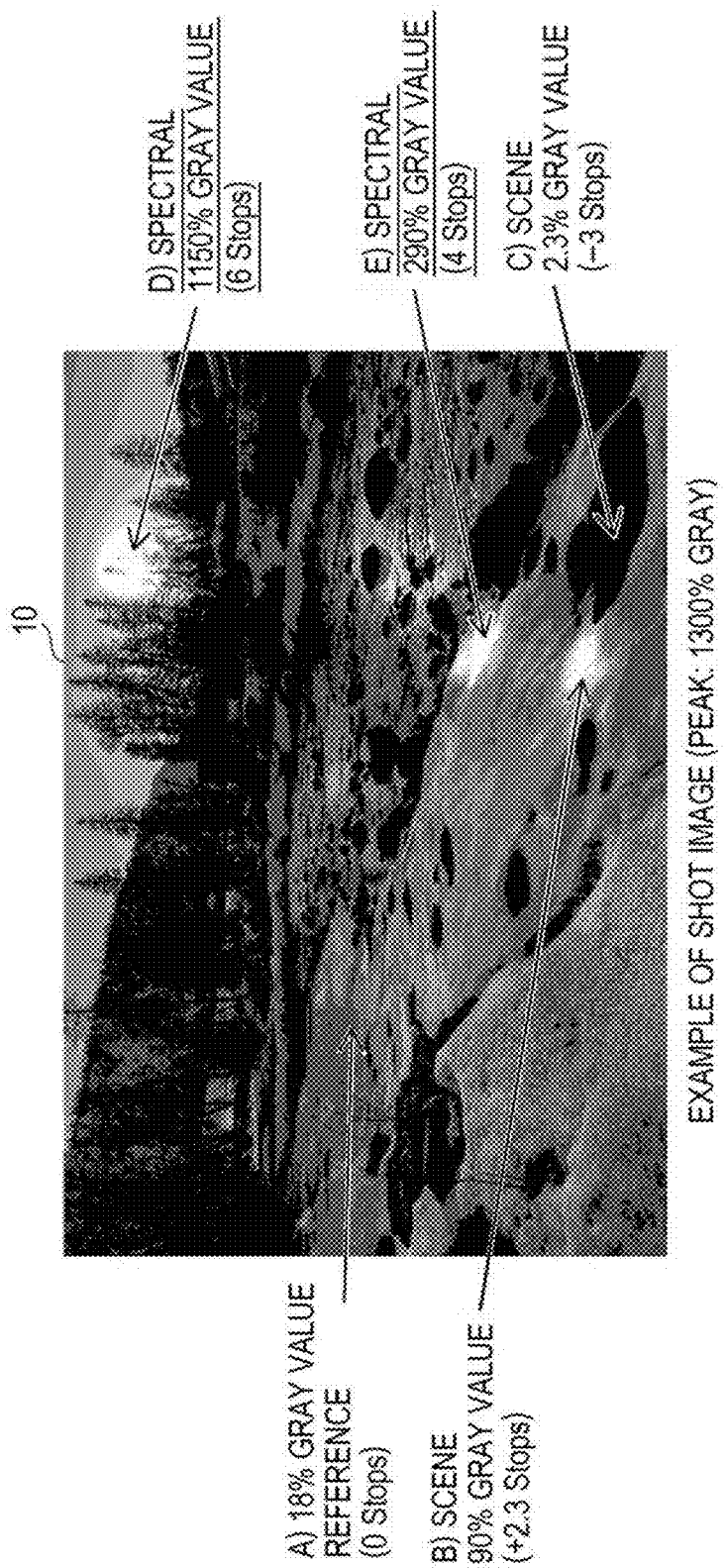
FIG. 7 is a diagram illustrating an example of luminance of an image that has been shot.

FIG. 7 is a diagram illustrating an example of luminance of an image that has been shot. In FIG. 7, A) in an image 10 that has been shot (hereinafter referred to as "original image") indicates pixels having a luminance corresponding to 18% gray (0 Stop) that is the reference reflectance serving as the reference for brightness (hereinafter referred to as "reference luminance" or "18% Gray value"). B) in 10 indicates pixels having luminance corresponding to 90% reflectance (90% gray) (2.3 Stops). C) in 10 indicates pixels having luminance corresponding to 2.3% gray (−3 Stops) that is almost black. D) in 10 indicates pixels obtained by shooting the sun, yielding luminance that is extremely bright, having luminance corresponding to 1150% gray (6 Stops). E) in 10 indicates pixels obtained by shooting portions with mirror reflection, having luminance corresponding to 290% gray (4 Stops).

Figure 8:
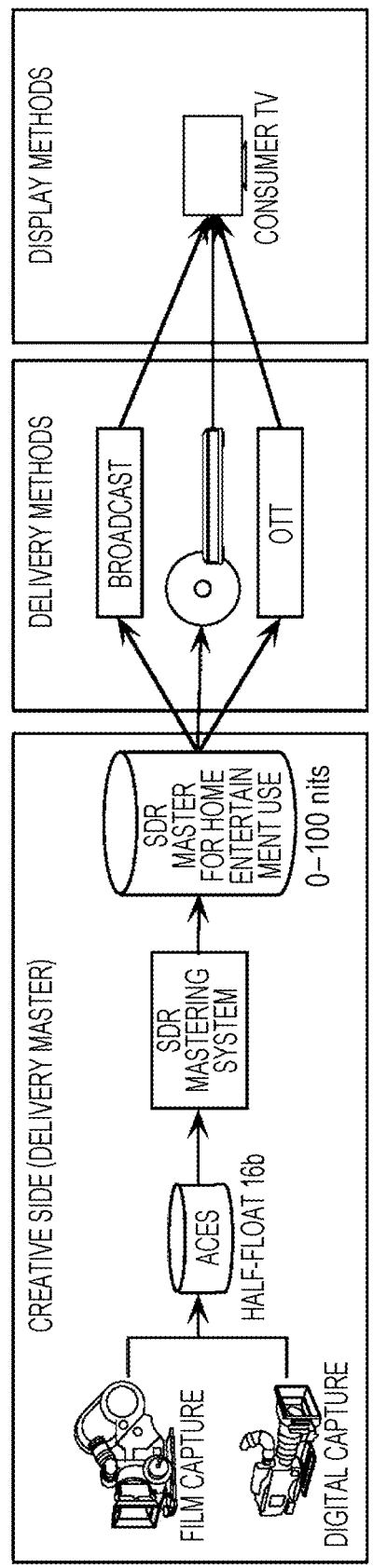
FIG. 8 is a diagram for describing the relationship between a flow of creating a master for SDR-capable home entertainment, a distribution medium, and a display device.

1-3. Relationship Between Master Generation, Distribution Method, and Display Device FIG. 8 is a diagram for describing the relationship between a flow of creating a master for SDR-capable home entertainment, a distribution medium, and a display device. The original image 10 described in FIG. 7 is an image of which the maximum luminance is 1300 nits. That is to say, in a case of creating a master image (SDR image) corresponding to SDR in which the maximum luminance is 100 nits using the original image 10, an SDR-capable master image cannot be created using the luminance of the original image 10 as it is without conversion, since SDR cannot express pixels having luminance exceeding 100 nits. That is to say, in order to create an SDR-capable master image using the original image 10, the luminance of the original image 10 needs to be converted into luminance of a dynamic range that is compatible with SDR.

1-4. Mastering from Original Image to SDR Image

Next, SDR grading processing (mastering processing) from the original image 10 to an SDR image will be described. First, in order to adapt video (image) of contents having high-luminance components exceeding 100 nits, shot by a camera, to a broadcasting standard such as Bt709 or the like, luminance is maintained linearly to around 80 nits or so by normal grading processing, and knee curve processing is performed at portions above that to keep the maximum luminance within 100 nits. Specifically, knee curve processing is processing where luminance at a certain value or lower is linearly displayed, and luminance at a certain value or higher is attenuated in accordance with the display peak luminance of the display device on which display is to be performed.

Figure 9A:
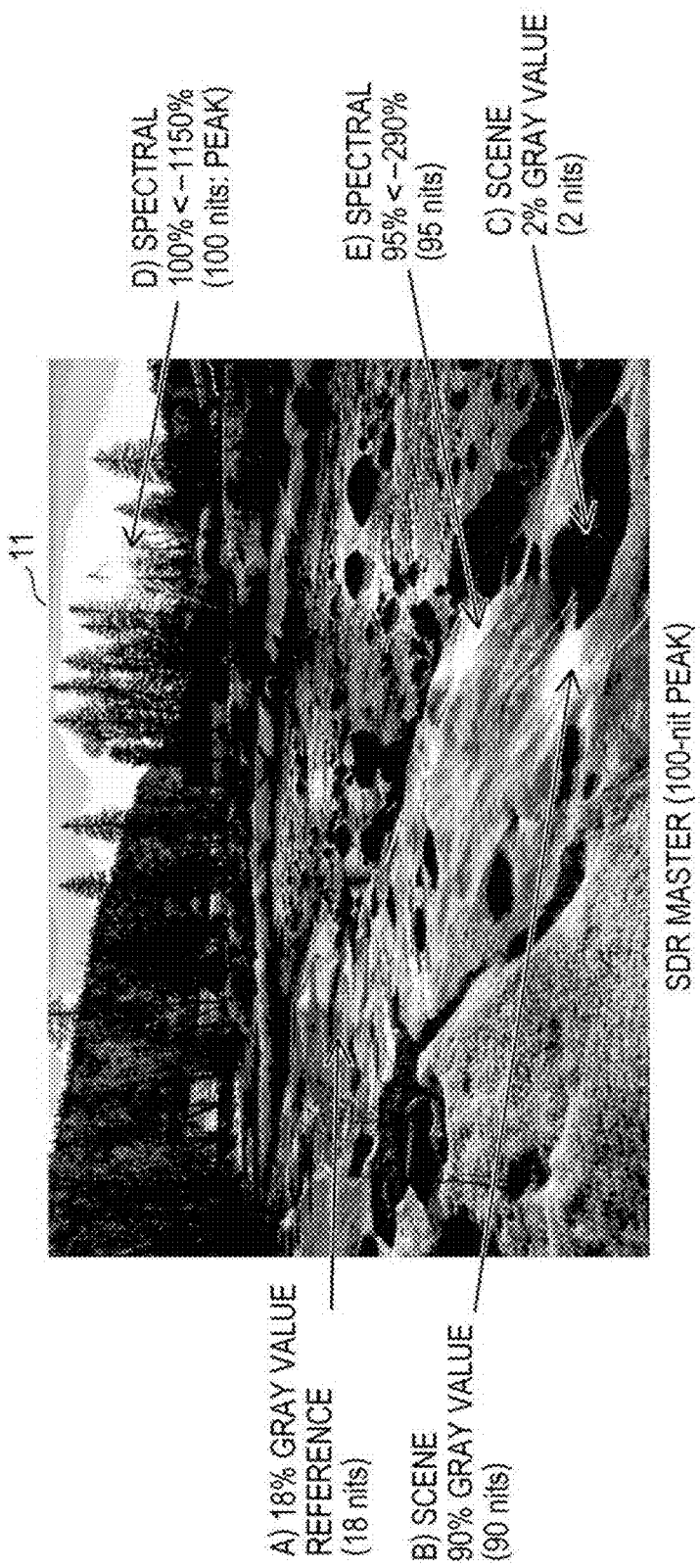
FIG. 9A is a diagram illustrating an example of luminance as a result of having mastered the original image illustrated in FIG. 7 to an SDR image.
Figure 9B:
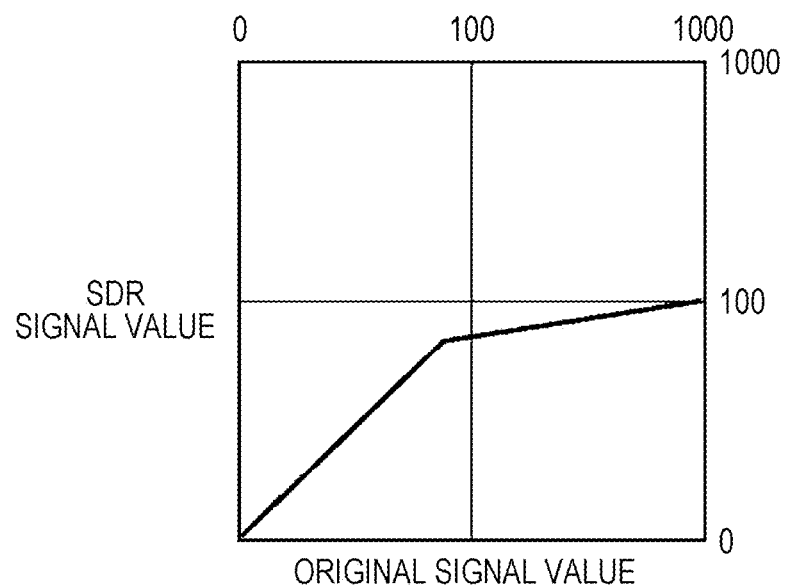
FIG. 9B is a diagram illustrating an example of the relationship between original signal values and SDR signal values, for converting (mastering) original signal values into SDR signal values.

FIG. 9A is a diagram illustrating an example of luminance as a result of having mastered the original image illustrated in FIG. 7 to an SDR image. FIG. 9B is a diagram illustrating an example of the relationship between original signal values and SDR signal values, for converting (mastering) original signal values into SDR signal values. Note that the original signal values are luminance in a dynamic range of 0 to 1300 nits in the original image 10 (hereinafter referred to as "luminance of original image 10"), and SDR signal values are luminance in the SDR luminance range (hereinafter referred to as "SDR luminance").

In the mastering from the original image 10 to an SDR image 11 in this example, pixels having a luminance corresponding to 18% gray (0 Stop) that is the reference reflectance are pixels having the reference luminance that is the reference for brightness, as illustrated in FIG. 9B. Accordingly, in the mastering to SDR image, the luminance of the pixels corresponding to 18% gray (18 nits) in the original image 10 is not changed even after converting the original image 10 into the SDR image 11, and is decided as the luminance for SDR.

In the mastering from the original image 10 to the SDR image 11 in this example, the luminance of the original image 10 is not changed in the luminance range at or below the luminance of the pixels corresponding to 90% gray (90 nits) in the original image 10 (0 to 90 nits), and is decided as the luminance for SDR, as illustrated in FIG. 9B. Also, the luminance of the original image 10 in the luminance range exceeding the luminance of the pixels corresponding to 90% gray (90 nits) in the original image 10 (91 to 1300 nits) is allocated to SDR luminance in the luminance range of 90 to 100 nits by linear conversion, as illustrated in FIG. 9B.

In mastering of pixels corresponding to 90% gray (2.3 Stops), indicated by B) in FIG. 9A, out of the pixels in the original image 10, to the SDR image 11 for example, the luminance of the pixels corresponding to 90% gray (90 nits) in the original image 10 is not changed even after converting the original image 10 into the SDR image 11, and is decided as the luminance for SDR.

Also, in mastering of pixels corresponding to 2.3% gray (−3 Stops), indicated by C) in FIG. 9A, out of the pixels in the original image 10, to the SDR image 11 for example, the luminance of the pixels corresponding to 2.3% gray (2 nits) in the original image 10 is not changed even after converting the original image 10 into the SDR image 11, and is decided as the luminance for SDR, in the same way as described above.

In mastering of pixels corresponding to 1150% gray (6 Stops), indicated by D) in FIG. 9A, out of the pixels in the original image 10, to the SDR image for example, the luminance of the pixels corresponding to 1150% gray (1150 nits) in the original image 10 is converted to 100 nits that is the maximum luminance for SDR.

Also, mastering of pixels corresponding to 290% gray (4 Stops), indicated by E) in FIG. 9A, out of the pixels in the original image 10, to the SDR image 11 for example, the luminance of the pixels corresponding to 290% gray in the original image 10 is converted to 95 nits.

1-5. First Mastering from Original Image to HDR Image

Figure 10B:
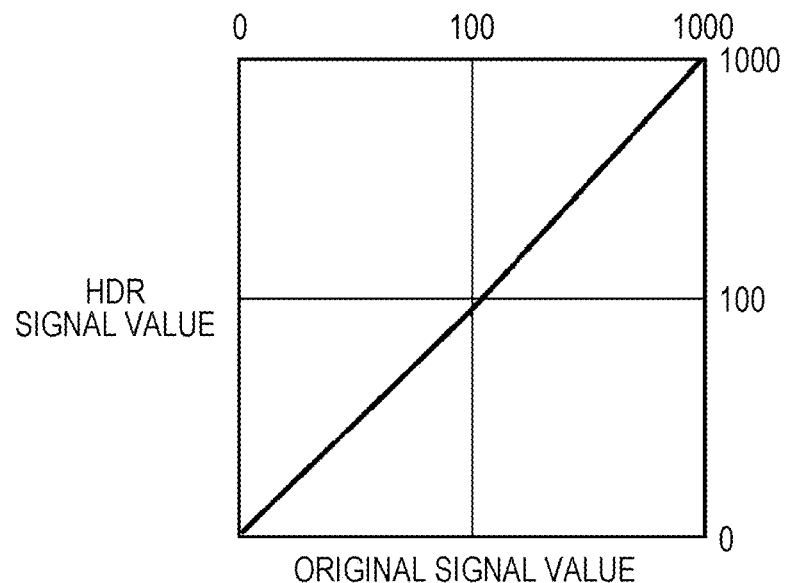
FIG. 10B is a diagram illustrating an example of the relationship between original signal values and HDR signal values, for converting (mastering) original signal values into HDR signal values.

FIG. 10A is a diagram illustrating an example of luminance as a result of having mastered the original image illustrated in FIG. 7 to an HDR image. FIG. 10B is a diagram illustrating an example of the relationship between original signal values and HDR signal values, for converting (mastering) original signal values into HDR signal values. Note that HDR signal values are luminance in the HDR luminance range (hereinafter referred to as "HDR luminance"). Note that in the mastering from the original image 10 to an HDR image in this example, allocation of luminance up to 2000 nits as luminance for HDR is permitted, so the luminance of the original image 10 can be maintained without change in the HDR image as well.

For example, pixels having a luminance corresponding to 18% gray (0 Stop) that is the reference reflectance are pixels having the reference luminance that is the reference for brightness, indicated by A) in FIG. 10A, out of the pixels in the original image 10, so in the mastering to HDR image, the luminance of the pixels corresponding to 18% gray (18 nits) in the original image 10 is not changed even after converting the original image 10 into the HDR image 12, and is decided as the luminance for HDR.

In the same way, in the mastering to HDR image, the luminance of the original image 10 is not changed for each of pixels corresponding to 90% gray (2.3 Stops) indicated by B), pixels corresponding to 2.3% gray (−3 Stops) indicated by C), pixels corresponding to 1150% gray (6 Stops) indicated by D), and pixels corresponding to 290% gray (4 Stops) indicated by E), for example, and is decided as the luminance for HDR.

1-6. Display Method

Figure 11:
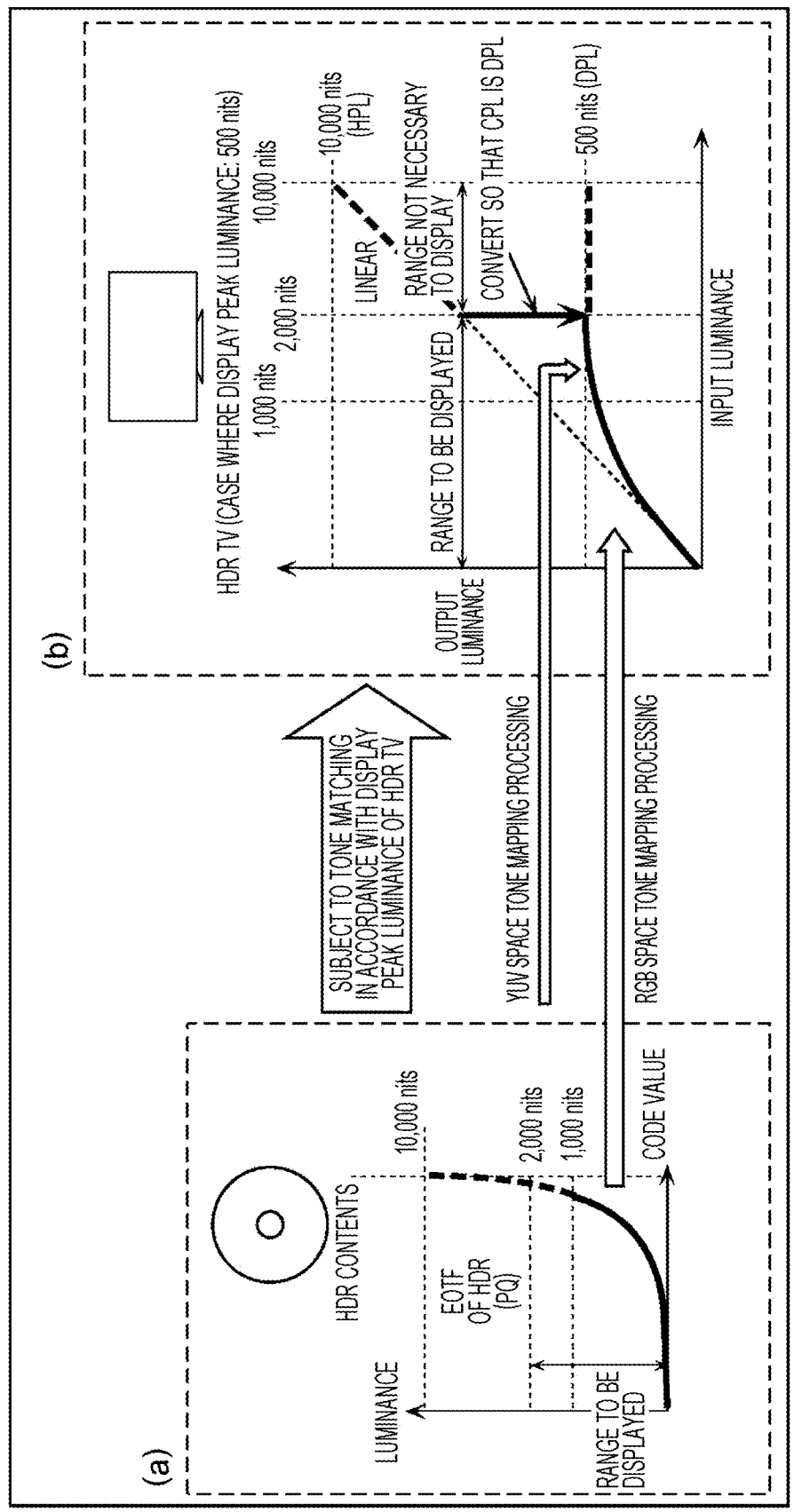
FIG. 11 is a diagram for describing a specific example of luminance conversion processing in a display method according to a first embodiment.

Next, a display method according to the first embodiment will be described with reference to FIG. 11. FIG. 11 is a diagram for describing a specific example of luminance conversion processing in a display method according to the first embodiment.

Dual tone mapping is performed in the display method according to the present embodiment, as illustrated in FIG. 11. In dual tone mapping, pixels having a luminance at or below a first predetermined luminance (e.g., 1000 nit) are subjected to tone mapping processing as to values of each RGB color defined in a normal RGB space (hereinafter referred to as "RGB space tone mapping"). In a case where the display peak luminance of an HDR TV is 500 nits for example, RGB space tone mapping is performed on pixels having luminance at or below 1000 nits, thereby expressing pixels having luminance at or below 1000 nits in the HDR video of the HDR contents in the luminance range of the HDR TV up to 460 nits. On the other hand, pixels having luminance exceeding the first predetermined luminance are subjected to tone mapping processing as to luminance defined in YUV space (hereinafter referred to as "YUV space tone mapping"), and not tone mapping processing in a normal RGB space. Note that in YUV tone mapping, processing is performed not only as to luminance making up the pixels, but also color difference making up the pixels.

In short, in the display method according to the first embodiment, video data of HDR video is acquired, and first determination is performed regarding each of multiple pixels making up the video contained in the acquired video data, regarding whether or not the luminance of that pixel exceeds the first predetermined luminance. Dual tone mapping is then performed, where luminance of each of the multiple pixels is reduced by different formats between a case where the result of the first determination is that the luminance of that pixel exceeds the first predetermined luminance, and a case where the result of the first determination is that the luminance of that pixel is at or below the first luminance. Thereafter, the HDR video is displayed on the display device using the results of dual tone mapping.

For each of the multiple pixels in dual tone mapping, YUV tone mapping is performed in a case where the luminance of that pixel exceeds the first predetermined luminance, and RGB space tone mapping is performed in a case where the luminance of that pixel is at or below the first predetermined luminance.

1-7. Advantages, Etc.

According to the display method of the present embodiment, one of two types of tone mapping processing can be selectively performed regarding multiple pixels included in HDR video of HDR contents, in accordance with whether or not the luminance that pixel has exceeds the first predetermined luminance, whereby color of each pixel can be suppressed from changing between before and after luminance conversion processing. That is to say, the luminance difference and color components of sparkle portions having a luminance range exceeding 1000 nits (video of lightning, fireworks, light bulbs, flames, explosions, the sun, reflections off water, and so forth, that are small regions) can be maintained, while maintaining reproducibility of video of luminance ranges at and below 1000 nits that is the first predetermined luminance.

Also, according to the display method of the present embodiment, for each of the multiple pixels included in HDR video of HDR contents, YUV space tone mapping is performed in a case where the luminance of that pixel exceeds the first predetermined luminance, so color of each pixel can be effectively suppressed from changing between before and after luminance conversion processing. Also, for each of the multiple pixels included in HDR video of HDR contents, RGB space tone mapping is performed in a case where the luminance of that pixel is the first predetermined luminance or lower, so reproducibility of the color of each can be maximally maintained between before and after luminance conversion processing.

Second Embodiment

A display method according to a second embodiment will be described with reference to FIG. 12 through 26. First, grading formats will be described.

2-1. Grading Formats

FIG. 12 is a table describing grading formats. There are generally three formats for HDR content grading formats, as illustrated in FIG. 12. Specifically, there is the Dolby Vision format, format similar to SDR (hereinafter referred to as "conventional format"), and the ACES (Academy Color Encoding System) format. The three formats will be described in order below.

In the Dolby Vision format, grading is performed based on absolute luminance reference, in accordance with display capabilities of a master monitor ("MASTER MONITOR" in FIG. 12), and HDR master video is generated by quantization of luminance of video signals obtained by grading using a PQ curve (PQ space). In the Dolby Vision format, the master video is generated using a high-luminance, 4000 nits for example, master monitor (e.g., Pulsar) of which the display peak luminance (maximum luminance) is extremely high, as the master monitor.

The Dolby Vision format generates SDR video using the generated master video, by separating into SDR signals for SDR video and auxiliary signals for reproducing HDR. Thus, the Dolby Vision format realizes compatibility between HDR and SDR. In this way, the Dolby Vision format has the luminance range (band) around 80 nits and lower shared in common between HDR and SDR, and the 18% gray (Middle Gray) value (point) is also shared in common, for compatibility between HDR and SDR. That is to say, only the luminance range (high-luminance portion) exceeding around 80 nits differs between HDR and SDR. The peak luminance (maximum luminance) of HDR video generated by the Dolby Vision format can express up to the maximum luminance of the high-luminance master monitor, so extremely high luminance of 2000 to 4000 nits is obtained.

The conventional format has a similar grading policy as that of the Dolby Vision format, and is based on an absolute luminance reference. However, the conventional format generates master video using a standard master monitor (e.g., Sony X300, high-end consumer-grade TV, etc.) of which the display peak luminance is equivalent to 1000 nits as the maser monitor.

Also, there is no compatibility between HDR and SDR in the conventional format. That is to say, SDR is generated by grading separately from HDR. Thus, HDR video graded by the conventional format has characteristics similar to the digital video (DV) format. This HDR video is dependent on the maximum luminance of the standard master monitor, and accordingly is around 800 to 1000 nits.

In the ACES format, grading is performed based on relative luminance reference. That is to say, HDR mater video is generated by grading independently from the display capabilities of the master monitor, and quantizing the luminance of video signals obtained in the grading by floating decimal point (relative luminance). The above-described standard master monitor is used as the master monitor in the ACES format.

Relatively luminance management is performed by ACES in the ACES format, so when generating HDR video or SDR video from the generated HDR master video, the luminance is converted while maintaining the relative relationship of the luminance in the HDR master video. Accordingly, SDR video with a peak luminance of 100 nits, and HDR video with a peak luminance of 1000 nits, can be easily generated. Automatic conversion is thus performed from luminance information that is managed according to relative luminance in the ACES format, in accordance with the peak luminance of the HDR video, so only the peak luminance difference between SDR video and HDR video, and the relative relationship therebetween is maintained. There are cases where the value of 18% gray (Middle Gray) is greater for HDR video than for SDR video. The HDR video generated by the ACES format is dependent on the maximum luminance of the standard master monitor, and accordingly is around 800 to 1000 nits.

As described above, the characteristics of HDR video obtained by grading according to each of the three formats differ. Accordingly, if display processing (tone mapping processing, etc.) is performed at an HDR TV assuming one of these three grading formats, HDR video that differs from what is known as "creator's Intent" (CI) may be displayed on the HDR TV.

Next, a conventional mastering configuration in a case of performing grading will be described.

2-2. Mastering Configuration of Conventional Format

Figure 13:
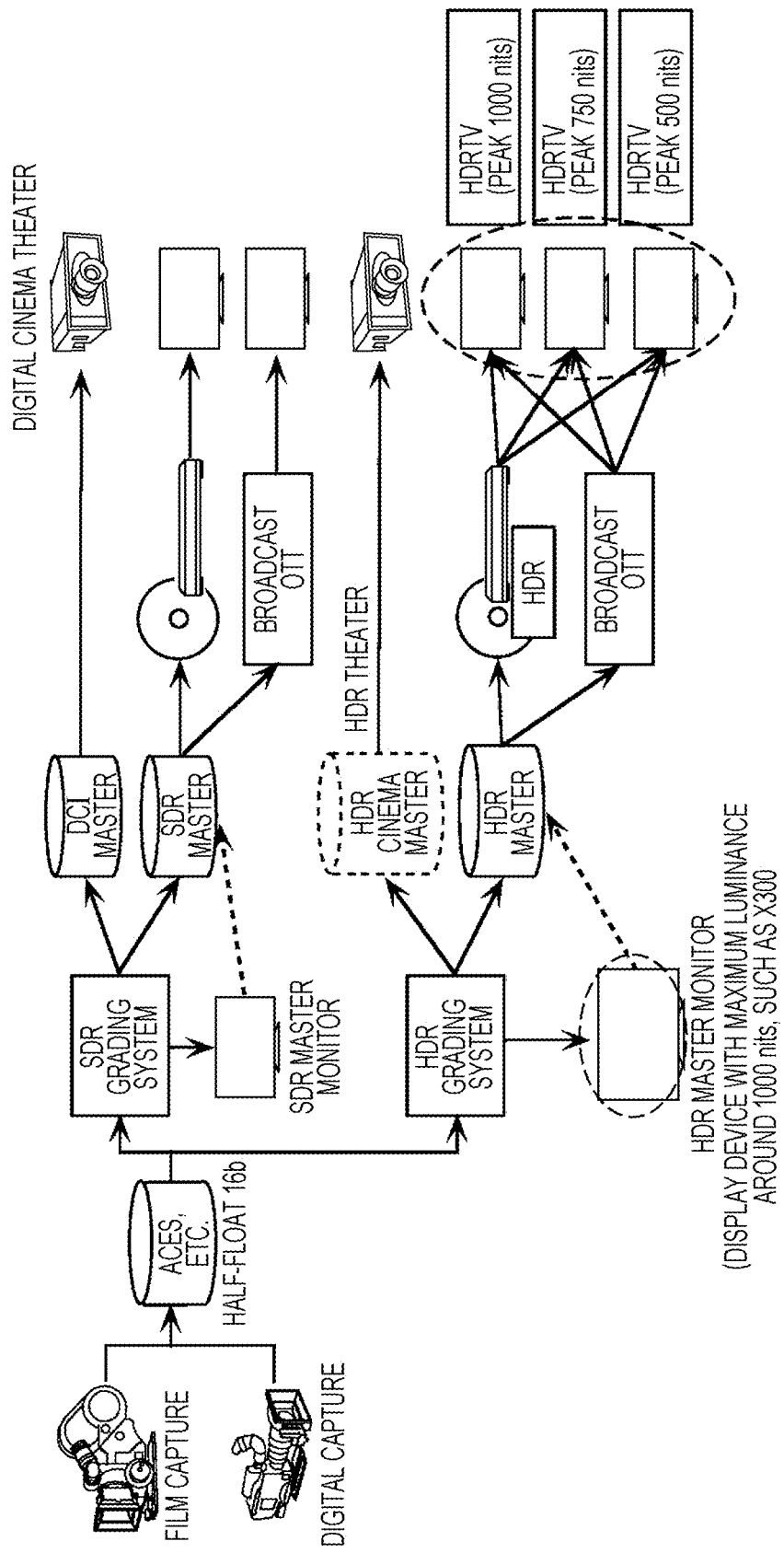
FIG. 13 is a diagram illustrating the overall configuration of HDR/SDR mastering in a case of performing HDR grading with a conventional format using a standard master monitor.

FIG. 13 is a diagram illustrating the overall configuration of HDR/SDR mastering in a case of performing HDR grading with the conventional format using a standard master monitor. In grading, HDR master video is created from material data such as the original image 10 before grading, while confirming images on an HDR-capable standard master monitor. The HDR master video is restricted by the display peak luminance of the standard master monitor (e.g., 1000 nits), so it is difficult to create HDR master video containing luminance components exceeding 1000 nits that is this display peak luminance.

HDR expressions matching how the HDR master video looks on the standard master monitor can be reproduced on each TV by this HDR master video being used in common among various distribution media (Blu-ray (a registered trademark), broadcasting, OTT, etc.), and each TV manufacturer adjusting the image quality in accordance with the capabilities of the TVs.

2-3. Mastering from Original Image to HDR Image by Conventional Format

Figure 14A:
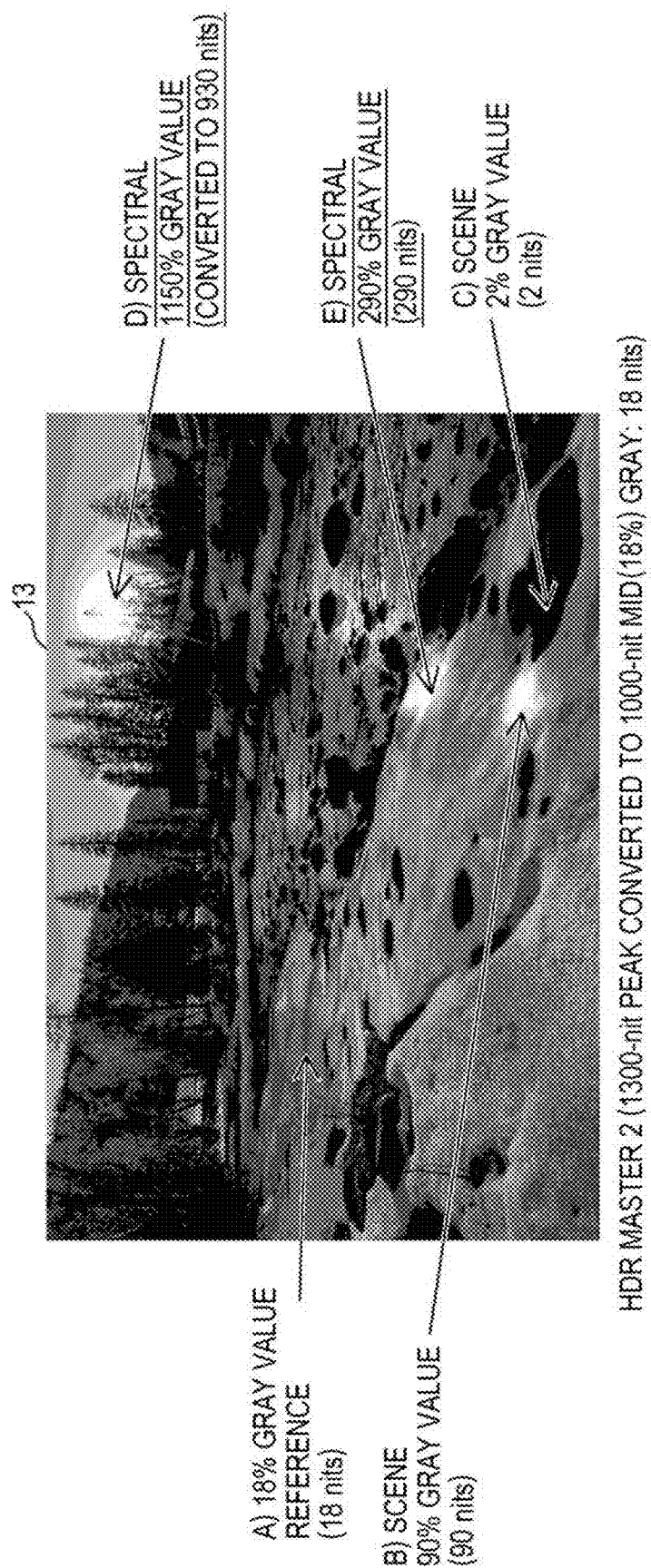
FIG. 14A is a diagram illustrating an example of luminance as a result of having mastered the original image illustrated in FIG. 7 to an HDR image by a conventional format.
Figure 14B:
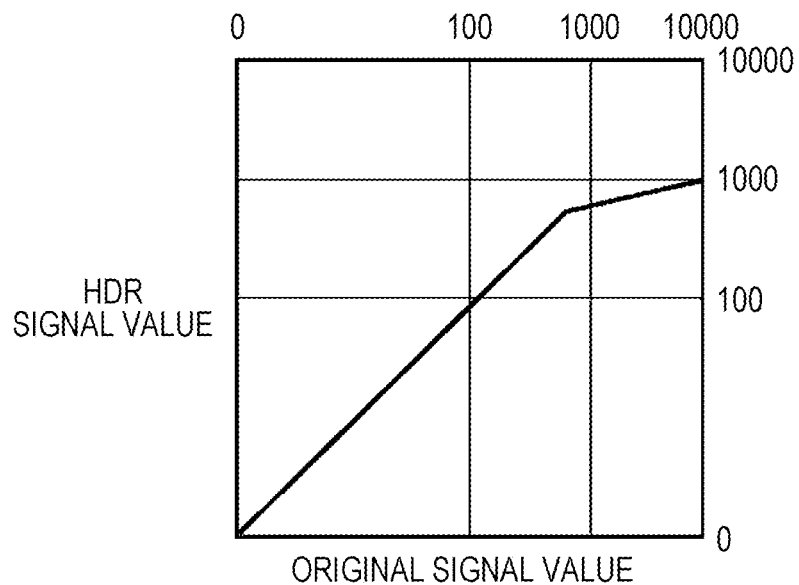
FIG. 14B is a diagram illustrating an example of the relationship between original signal values and HDR signal values, for converting (mastering by conventional format) original signal values into HDR signal values.

FIG. 14A is a diagram illustrating an example of luminance as a result of having mastered the original image illustrated in FIG. 7 to an HDR image by a conventional format. FIG. 14B is a diagram illustrating an example of the relationship between original signal values and HDR signal values, for converting (mastering by conventional format) original signal values into HDR signal values.

Note that in the mastering from the original image 10 to the HDR image 13 in this example, the display peak luminance of the standard master monitor being used is restricted to 1000 nits, so values of 900% or higher cannot be held as they are. Accordingly, knee curve processing to suppress the peak luminance to 1000 nits is introduced, in the same way as mastering to an SDR image.

As illustrated in FIG. 14B, pixels corresponding to 18% gray (0 Stop), that is the reference reflectance, in the mastering from the original image 10 to the HDR image 13 in this example, are pixels having reference luminance serving as a reference for brightness. Accordingly, the luminance of the pixels corresponding to 18% gray (18 nits) in the original image 10 is not changed even after converting the original image 10 into the HDR image 13, and is decided as the luminance for HDR.

Now, in the mastering from the original image 10 to the HDR image 13, the luminance of the original image 10 is not changed in the luminance range at or below the luminance of the pixels corresponding to 900% gray (900 nits) in the original image 10 (0 to 900 nits), and is decided as the luminance for HDR, as illustrated in FIG. 14B. Also, the luminance of the original image 10 in the luminance range exceeding the luminance of the pixels corresponding to 900% gray (900 nits) in the original image 10 (901 to 10,000 nits) is allocated to HDR luminance in the luminance range of 900 to 1000 nits by linear conversion, as illustrated in FIG. 14B.

For example, in mastering of pixels corresponding to 18% gray (0 Stop), indicated by A) in FIG. 14A, out of the pixels in the original image 10, to the HDR image 13, the luminance of the pixels corresponding to 18% gray (18 nits) in the original image 10 is not changed even after converting the original image 10 into the HDR image 13, and is decided as the luminance for HDR.

For example, in mastering of pixels corresponding to 90% gray (2.3 Stops), indicated by B) in FIG. 14A, out of the pixels in the original image 10, to the HDR image 13, the luminance of the pixels corresponding to 90% gray (90 nits) in the original image 10 is not changed even after converting the original image 10 into the HDR image 13, and is decided as the luminance for HDR.

Also for example, in mastering of pixels corresponding to 2.3% gray (−3 Stops), indicated by C) in FIG. 14A, out of the pixels in the original image 10, to the HDR image 13, the luminance of the pixels corresponding to 2.3% gray (2 nits) in the original image 10 is not changed even after converting the original image 10 into the HDR image 13, and is decided as the luminance for HDR.

For example, in mastering of pixels corresponding to 1150% gray (6 Stops), indicated by D) in FIG. 14A, out of the pixels in the original image 10, to the HDR image 13, the luminance of the pixels corresponding to 1150% gray (1150 nits) in the original image 10 is converted to 930 nits for example, by knee curve processing.

Also for example, in mastering of pixels corresponding to 290% gray (4 Stops), indicated by E) in FIG. 14A, out of the pixels in the original image 10, to the HDR image, the luminance of the pixels corresponding to 290% gray (290 nits) in the original image 10 is not changed even after converting the original image 10 into the HDR image 13, and is decided as the luminance for HDR.

Figure 15:
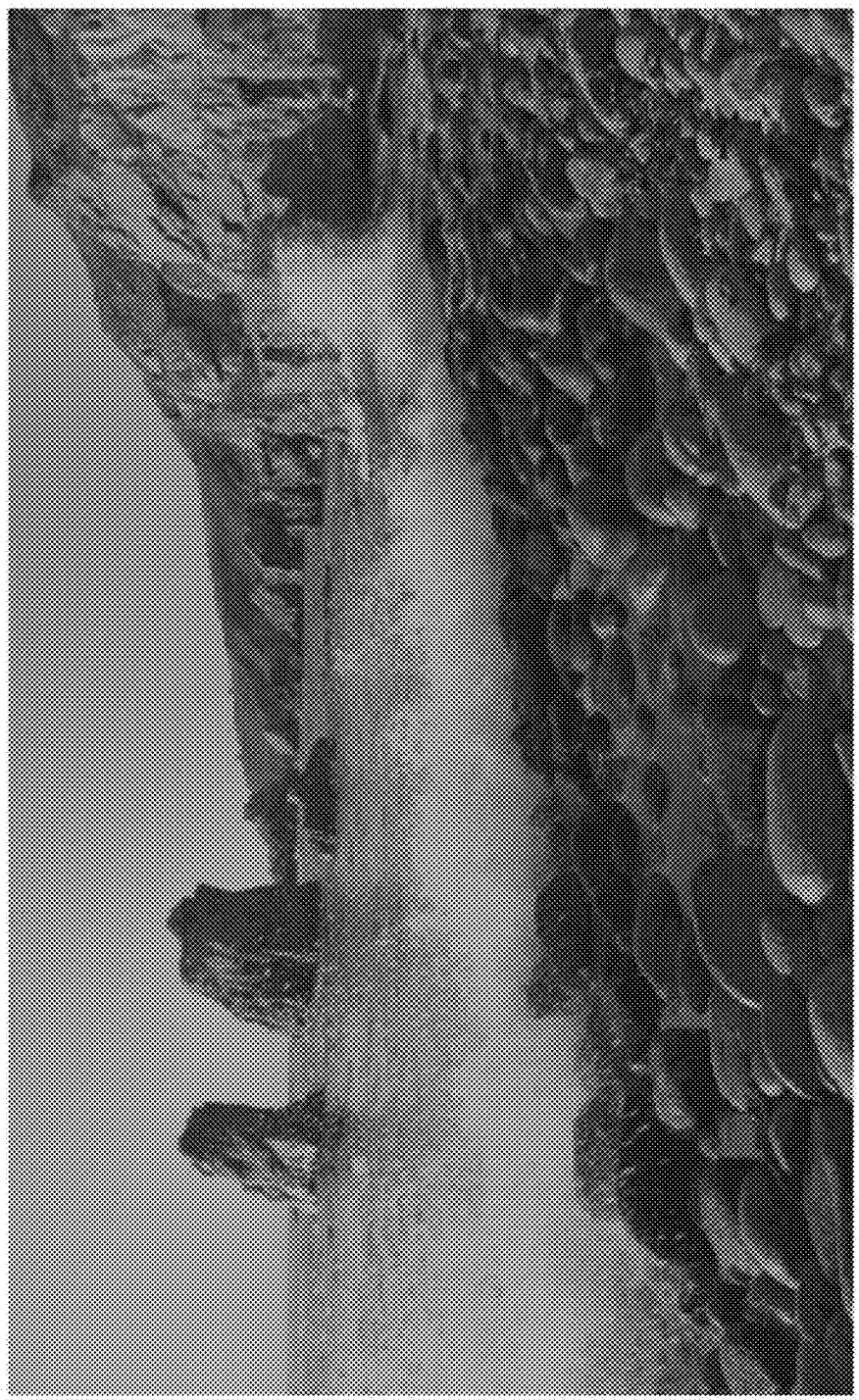
FIG. 15 is a diagram illustrating an example of an SDR image obtained by HDR grading by a conventional format.
Figure 16:
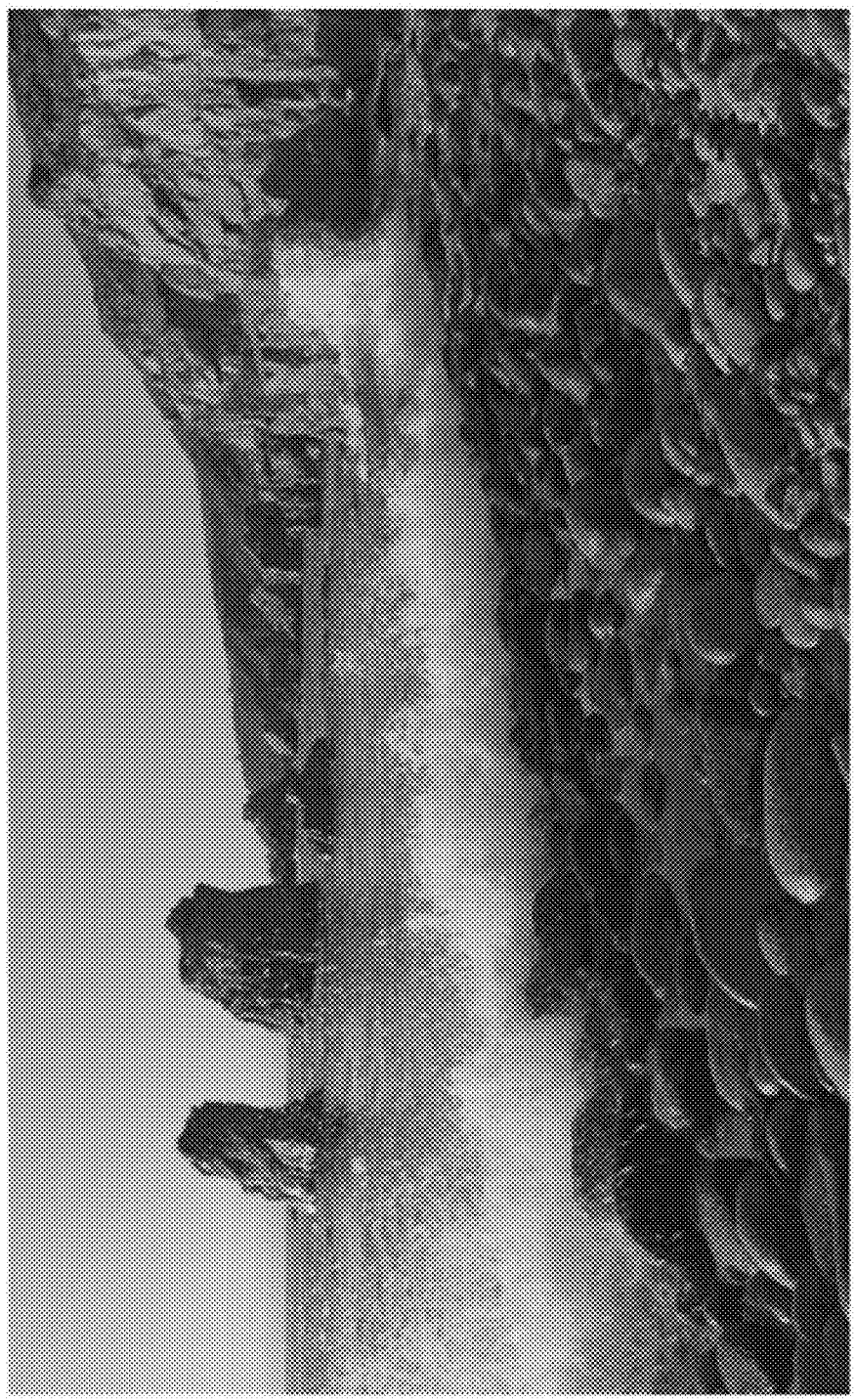
FIG. 16 is a diagram illustrating an example of an HDR image obtained by HDR grading by a conventional format.

FIG. 15 is a diagram illustrating an example of an SDR image obtained by HDR grading by the conventional format. FIG. 16 is a diagram illustrating an example of an HDR image obtained by HDR grading by the conventional format. It can be seen from FIGS. 15 and 16 by comparing the SDR image and HDR image that portions with high luminance, such as wave caps and the sky, change due to HDR grading, but luminance at SDR portions at 90 nits or lower does not change.

2-4. Configuration of ACES Format Mastering

Figure 17:
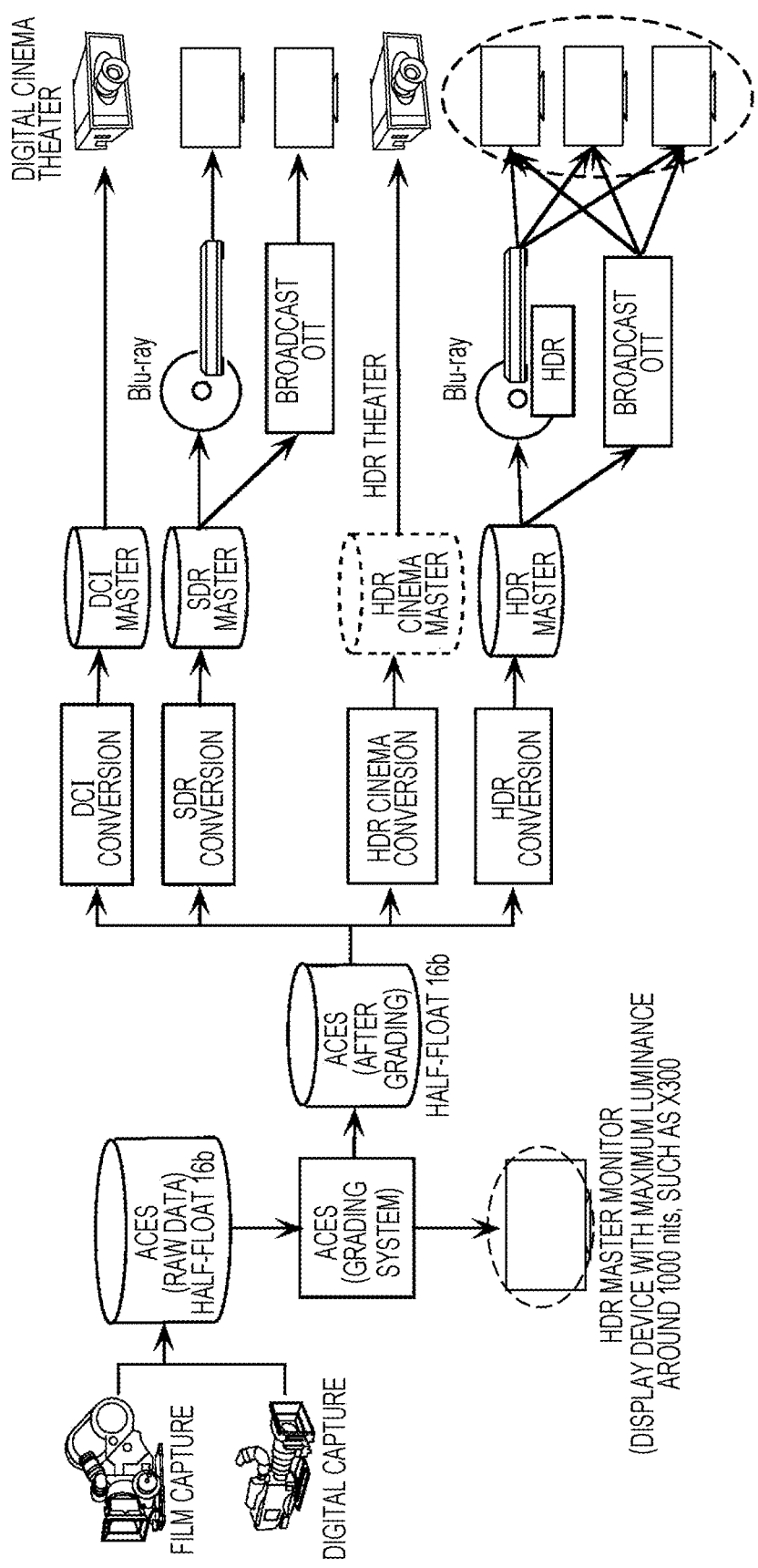
FIG. 17 is a diagram illustrating the overall configuration of HDR/SDR mastering in a case of performing ACES/HDR grading by ACES format using a standard mastering monitor.

FIG. 17 is a diagram illustrating the overall configuration of HDR/SDR mastering in a case of performing ACES/HDR grading by ACES format using a standard mastering monitor. In grading, ACES/HDR master video is created from material data such as the original image 10 before grading, while confirming images on an HDR-capable standard master monitor. The ACES/HDR master video is restricted by the display peak luminance of the standard master monitor (e.g., 1000 nits), but the ACES/HDR master video is created using floating decimal point (relative luminance expression) and not using the absolute luminance reference in this case. Accordingly, the ACES/HDR master video is not restricted to 1000 nits.

An HDR master video matching the maximum luminance of the HDR master video can be created by converting the ACES/HDR master video through an ACES HDR converter. At this time, master videos with a peak luminance of 1300 nits or 800 nits can be created, even if the display peak luminance of the master monitor is 1000 nits. HDR expressions matching how the HDR master video looks can be reproduced on each TV by this HDR master video being used in common among various distribution media (Blu-ray (a registered trademark), broadcasting, OTT, etc.), and each TV manufacturer adjusting the image quality in accordance with the capabilities of the TVs (see http://www.oscars.org/science-technology/sci-tech-projects/aces for details).

2-5. Mastering from Original Image to HDR Image by ACES Format

Figure 18A:
FIG. 18A is a diagram illustrating an example of luminance as a result of having mastered the original image illustrated in FIG. 7 to an HDR image using the ACES format.
Figure 18B:
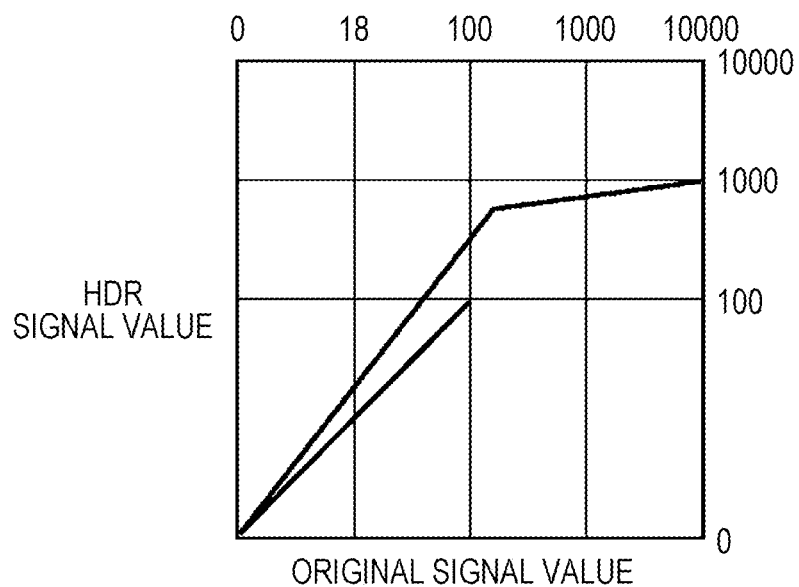
FIG. 18B is a diagram illustrating an example of the relationship between original signal values and HDR signal values, for converting (mastering using the ACES format) original signal values into HDR signal values.

FIG. 18A is a diagram illustrating an example of luminance as a result of having mastered the original image illustrated in FIG. 7 to an HDR image by the ACES format. FIG. 18B is a diagram illustrating an example of the relationship between original signal values and HDR signal values, for converting (mastering by ACES format) original signal values into HDR signal values.

Grading can be performed matching the display peak luminance of the master monitor being used in the same way as in FIGS. 14A and 14B, in a case of using ACES as well. In this case, the results will be the same as in FIGS. 14A and 14B. In the case of ACES, the broader luminance band (luminance range) can be effectively used to convert the 18% gray value so as to be double, which is 36 nits, rather than 18 nits, to give the dark portions (low-luminance range) more information.

FIG. 18A is an example of the results of mastering the original image 10 illustrated in FIG. 7 to an HDR image, specifying the 18% gray value to be 36 nits, which is double. Note that in the mastering from the original image 10 to an HDR image 14 in this example, the inclination of the linear portion in the low-luminance range is changed to double, in order to change the 18% gray value from 18 nits to 36 nits. Knee curve processing to suppress the peak luminance to 1000 nits is also introduced.

For example, in mastering of pixels corresponding to 18% gray (0 Stop), indicated by A) in FIG. 18A, out of the pixels in the original image 10, to the HDR image 14, the luminance of the pixels is changed from 18 nits to 36 nits. Also, for example, in mastering of respective pixels corresponding to 90% gray (2.3 Stops), indicated by B), 2.3% gray (−3 Stops), indicated by C), and 290% gray (4 Stops), indicated by E), to the HDR image 14, these each become doubled values, since the inclination of the linear portion of the low-luminance range has changed to double. Also, for example, in mastering of pixels corresponding to 1150% gray (6 Stops), indicated by D, to the HDR image 14, the luminance of the pixels corresponding to 1150% gray (1150 nits) in the original image 10 is converted to 950 nits for example, by knee curve processing.

Figure 19:
FIG. 19 is a diagram illustrating an example of an SDR image automatically generated from ACES/HDR master video obtained by ACES/HDR grading using the ACES format.
Figure 20:
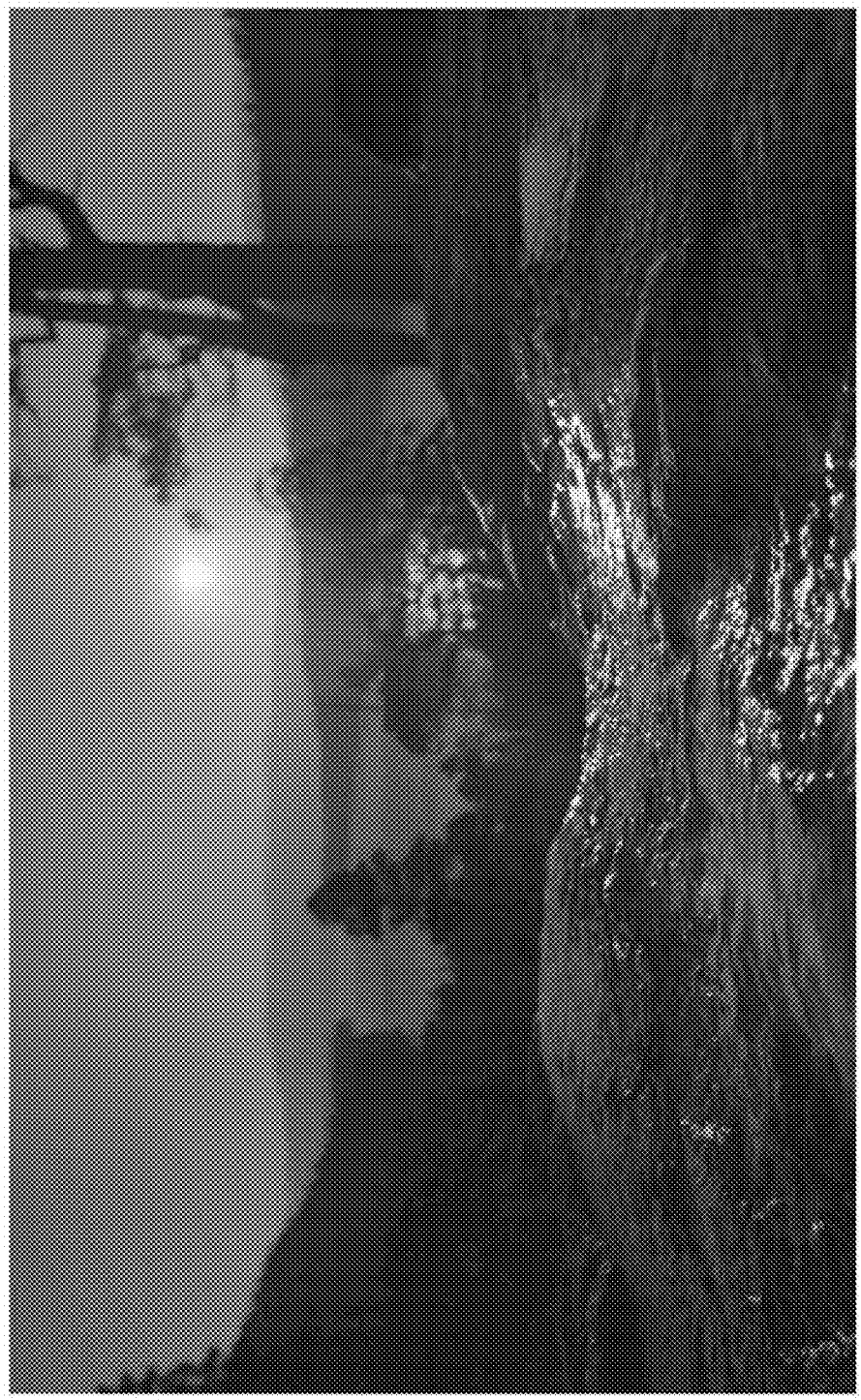
FIG. 20 is a diagram illustrating an example of an HDR image automatically generated from ACES/HDR master video obtained by ACES/HDR grading using the ACES format.

FIG. 19 is a diagram illustrating an example of an SDR image automatically generated from ACES/HDR master video obtained by ACES/HDR grading using the ACES format. FIG. 20 is a diagram illustrating an example of an HDR image automatically generated from ACES/HDR master video obtained by ACES/HDR grading using the ACES format. It can be seen by comparing the SDR image and HDR image illustrated in FIGS. 19 and 20 that the HDR image is generated while maintaining the relative relationships among sun, reflections off the water, and dark forest, between SDR/HDR. Accordingly, the luminance in dark portions is not the same in the HDR image and SDR image obtained by grading with the ACES format, like in the HDR image and SDR image according to the conventional format.

2-6. Configuration of Dolby Vision Format Mastering

Figure 21:
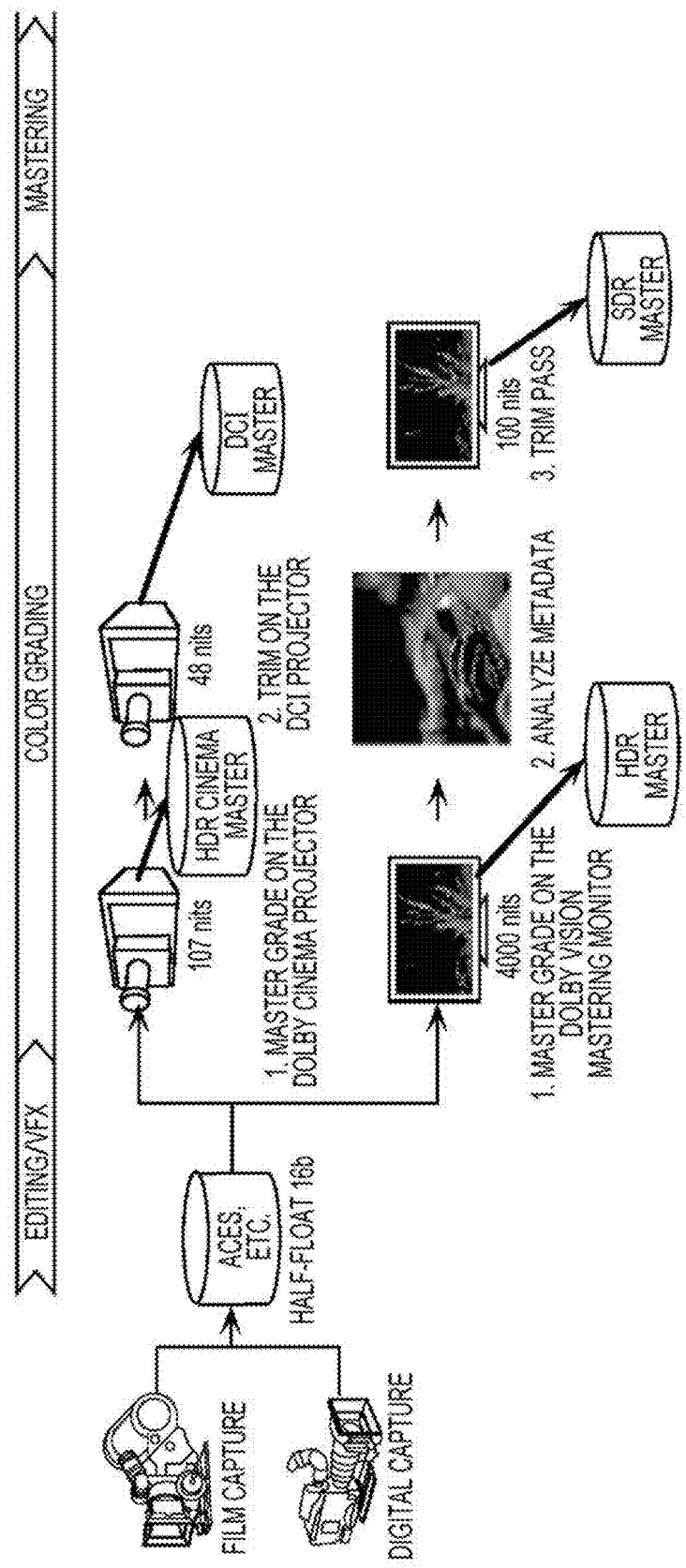
FIG. 21 is a diagram illustrating the overall configuration of HDR/SDR mastering in a case of performing HDR grading by Dolby Vision format using a high-luminance mastering monito.

FIG. 21 is a diagram illustrating the overall configuration of HDR/SDR mastering in a case of performing HDR grading by Dolby Vision format using a high-luminance mastering monitor. In the case of the Dolby Vision format, there are dedicated master monitors for Dolby Vision in HDR, for both theater and consumer-use, grading processing being performed in accordance with these mater monitors. SDR is automatically generated from high-luminance master video generated according to the Dolby Vision format.

In grading, high-luminance master video is created from material data such as the original image 10 before grading, while confirming images on an HDR-capable high-luminance master monitor. The display peak luminance of the high-luminance master video is high luminance, such as 4000 nits for example, so grading can normally be performed without performing luminance conversion processing. The high-luminance master video obtained by grading using a high-luminance master monitor takes advantage of the display capabilities of the high-luminance master monitor up to 4000 nits, to realize HDR effects where the overall is generally subdued, while the luminance of video of lightning, neon signs, fireworks, fire, and so forth, is extremely high, and contrast is accented.

This high-luminance master can be used in common for both a dedicated distribution format for Dolby Vision devices, and various distribution media (Blu-ray (a registered trademark), broadcasting, OTT) in standard HDD format for Dolby Vision non-compatible devices. That is to say, an HDR master contains Dolby Vision metadata and an SDR master for Dolby Vision (see http://www.dolby.com/us/en/technologies/dolby-vision.html and http://www.dolby.com/us/en/technologies/dolby-vision-color-grading.pdf for details).

2-7. Mastering from Original Image to HDR Image by Dolby Vision Format

Figure 22A:
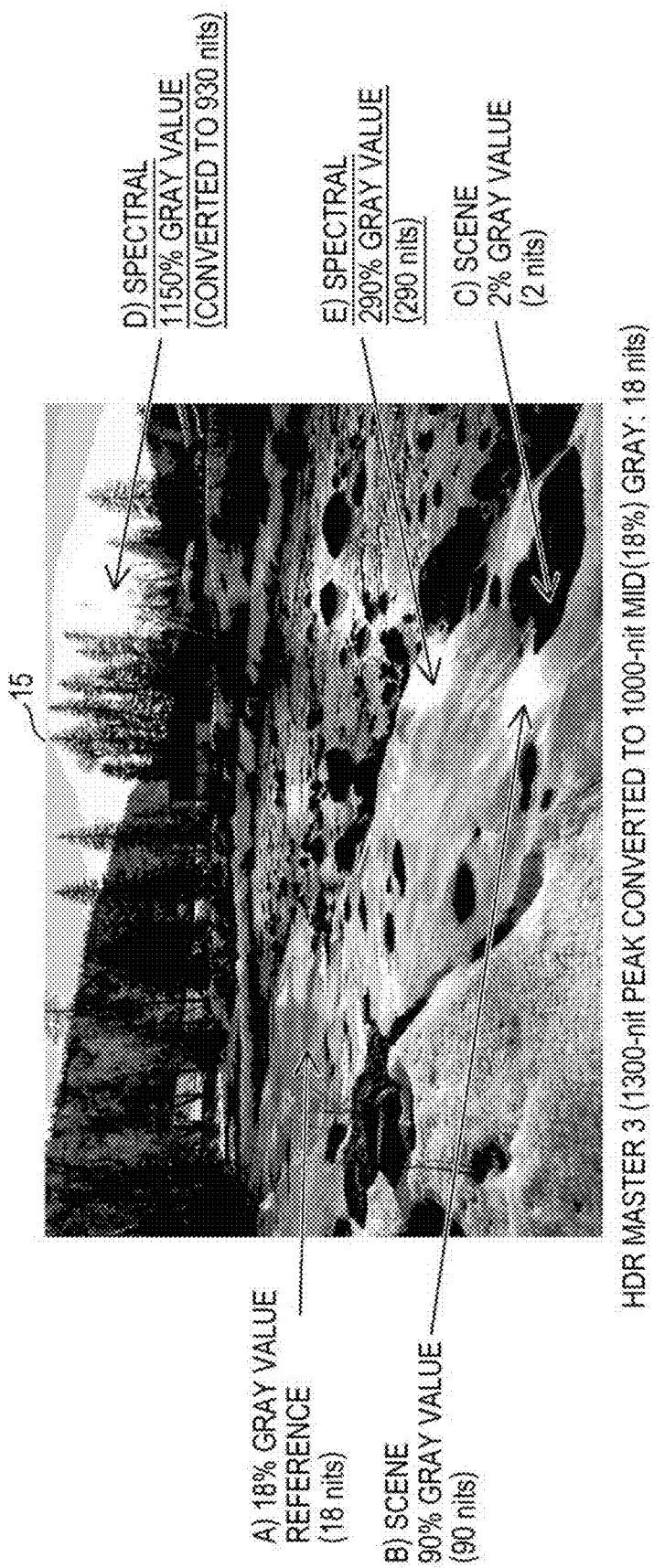
FIG. 22A is a diagram illustrating an example of luminance as a result of having mastered the original image illustrated in FIG. 7 to an HDR image using the Dolby Vision format.
Figure 22B:
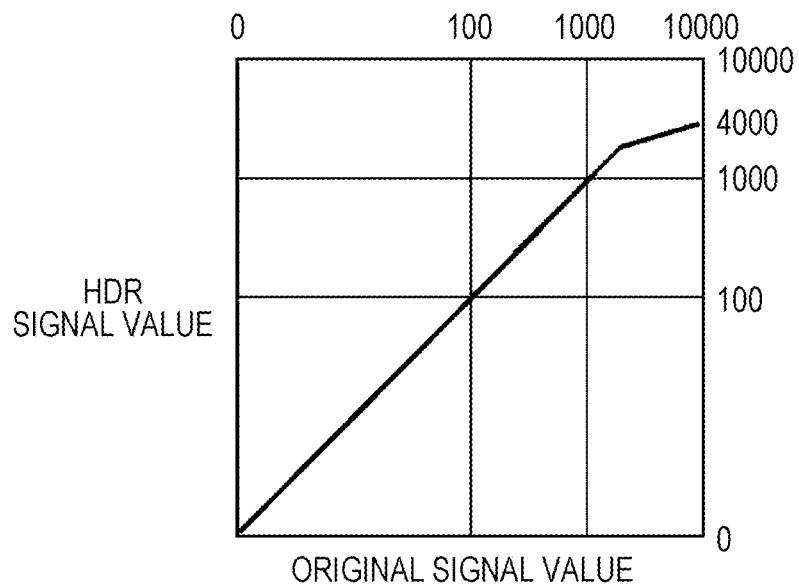
FIG. 22B is a diagram illustrating an example of the relationship between original signal values and HDR signal values, for converting (mastering using the Dolby Vision format) original signal values into HDR signal values.

FIG. 22A is a diagram illustrating an example of luminance as a result of having mastered the original image illustrated in FIG. 7 to an HDR image using the Dolby Vision format. FIG. 22B is a diagram illustrating an example of the relationship between original signal values and HDR signal values, for converting (mastering using the Dolby Vision format) original signal values into HDR signal values.

In this example, the values after mastering are permitted up to 10,000 nits in a case of using the PQ curve, and since the display peak luminance of the high-luminance master monitor in the Dolby Vision format is up to 4000 nits, introduction of the knee curve normally is unnecessary. Specifically, in a low-luminance range of 80 to 90 nits and lower, the HDR image and SDR image are exactly the same. Knee curve processing similar to that in SDR is introduced only for luminance exceeding 4000 nits, to restrict the peak luminance to within 4000 nits.

For example, in mastering of pixels corresponding to 18% gray (0 Stop), indicated by A) in FIG. 22A, out of the pixels in the original image 10, to the HDR image 15, the luminance of the pixels corresponding to 18% gray (18 nits) in the original image 10 is not changed even after converting the original image 10 into the HDR image 15, and is decided as the luminance for HDR. Also, for example, in mastering of pixels corresponding to 90% gray (2.3 Stops), indicated by B), 2.3% gray (−3 Stops), indicated by C), and 290% gray (4 Stops), indicated by E), to the HDR image 15, 90 nits, 2 nits, and 290 nits are decided as the luminance for HDR, without change. Also, for example, in mastering of pixels corresponding to 1150% gray (6 Stops), indicated by D), to the HDR image 15, the luminance of the pixels corresponding to 1150% gray (1150 nits) in the original image 10 is converted to 1050 nits for example, by knee curve processing.

Figure 23:
FIG. 23 is a diagram illustrating an example of a digital cinema evaluation content "Stem" thought to have effects equivalent to an automatically generated SDR image, from a high-luminance master video obtained by HDR grading using the Dolby Vision format.
Figure 24:
FIG. 24 is a diagram illustrating an example of a digital cinema evaluation content "Stem" thought to have inclination equivalent to a high-luminance master video obtained by HDR grading using the Dolby Vision format.

FIG. 23 is a diagram illustrating an example of a digital cinema evaluation content "Stem" thought to have effects equivalent to an automatically generated SDR image, from a high-luminance master video obtained by HDR grading using the Dolby Vision format. FIG. 24 is a diagram illustrating an example of a digital cinema evaluation content "Stem" thought to have inclination equivalent to a high-luminance master video obtained by HDR grading using the Dolby Vision format.

It can be seen from FIGS. 23 and 24 that portions with high luminance in the HDR image, such as light bulbs and candles, have extremely high values as compared to the SDR image, but luminance of portions around 90 nits and below are unchanged.

2-8. Problems with the Formats

FIG. 25 is a table describing issues with three grading formats. The characteristics of HDR contents obtained by grading with the three formats differ from each other, as illustrated in FIG. 12. Accordingly, the problems with HDR TV regarding performing display processing (tone mapping processing, etc.) with commercial-grade HDR TVs differ as illustrated in FIG. 25. In other words, the problems for HDR TV greatly differ depending on whether video according to absolute luminance management or whether video according to relative luminance management, and display processing needs to be performed that is appropriate for each video. However, HDR TV has not taken into consideration determining whether video according to absolute luminance management or video according to relative luminance management, and performing different display processing for absolute luminance management and relative luminance management.

Now, in order to determine whether video according to absolute luminance management or video according to relative luminance management, there is the need to identify the three grading formats. However, in a case of an HDR TV that is not Dolby Vision format, there is no way to tell which format transmitted HDR signals were graded according to, of Dolby Vision, conventional format, or ACES format. Accordingly, HDR TV has displayed HDR video of HDR signals ignoring the difference among the three grading formats.

Accordingly, if the HDR TV could know which of the three formats the HDR content was graded by before playing the HDR contents, this display processing such as tone mapping processing and the like suited to that format could be performed. However, in reality, HDR TV does not include information directly indicating which format the HDR content was graded by at the playback start point of the HDR content, so it is difficult to identify the grading format.

Figure 26:
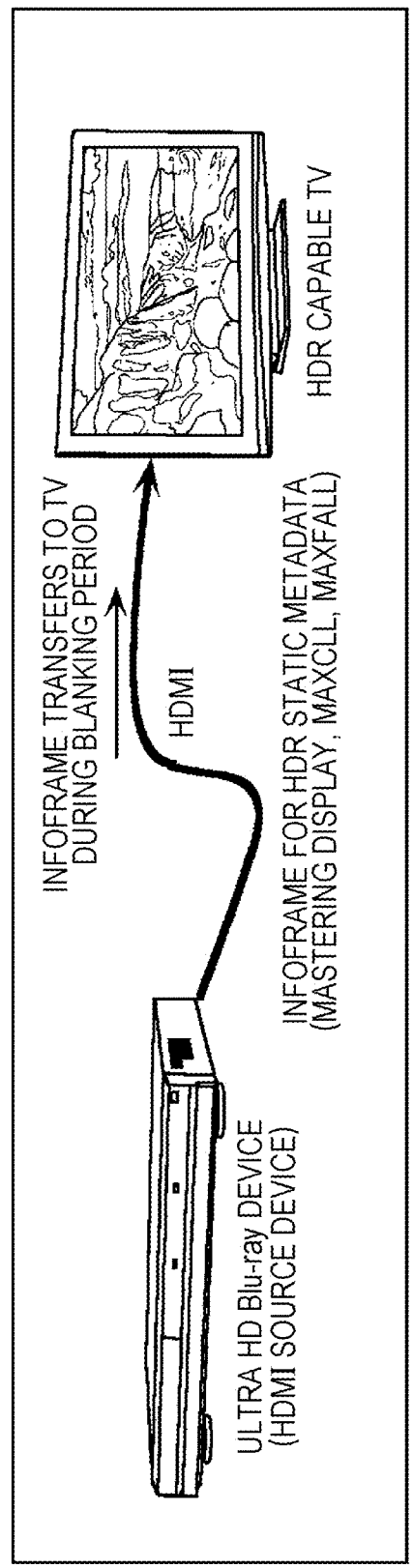

FIG. 26 is a diagram illustrating an example of connecting an HDR-capable Ultra HD Blu-ray (a registered trademark) device to an HDR TV via HDR-capable HDMI (a registered trademark) 2.0.

In a case of connecting an Ultra HD Blu-ray (a registered trademark) device and an HDR TV via HDMI (a registered trademark) 2.0 in this way, static metadata (ST 2086 and other information) relating to the HDR video transmitted from the Ultra HD Blu-ray (a registered trademark) device can be transmitted as an HDMI (a registered trademark) InfoFrame. Accordingly, the HDR TV can obtain minimal information of static metadata relating to the HDR contents.

Note, however, that an HDR TV can only obtain minimal information regarding what sort of mater monitor the HDR contents to be played were graded by, and minimal statistical information about of the HDR content from this static metadata information (ST 2086, etc.) alone. Accordingly, it is difficult to use the static metadata to determine which format of the three formats the HDR content was graded by.

Particularly, in a case of HDR contents graded by the conventional format or the ACES format, even if HDR playback control processing is performed with the wrong playback control format ideal for one or the other selected, playback normally can be performed without major failure. On the other hand, grading characteristics of graded contents greatly differ between the conventional format or ACES format and the Dolby Vision format, so if there is error in selection of the format, the HDR playback image quality may fail. Accordingly, it is important to determine whether the HDR contents have been graded by Dolby Vision.

2-9. Display Method

Next, the display method according to the second embodiment will be described. Effectively using information obtained from static metdata included in the video data to determine whether or not grading was performed by the Dolby Vision format enables realization of more appropriate display control in the display method according to the present embodiment. In the Dolby Vision format, grading is performed using a special high-luminance master monitor (Pulsar) as described above, and this fact is utilized to estimate, using the ST 2086 information included in the static metadata.

Characteristics of the master monitor used for grading is included in the ST 2086 information. Accordingly, using the ST 2086 information enables estimation of whether or not the HDR contents were generated using a special high-luminance master monitor used in grading in the Dolby Vision format. That is to say, in the display method according to the present embodiment, second determining is performed of determining whether or not luminance of the video included in the video data is absolute-luminance managed or relative-luminance managed, based on the static metadata included in the acquired video data. In a case where the luminance of the video included in the video data is found to be absolute-luminance managed as a result of the second determination, the dual tone mapping described in the first embodiment is performed. On the other hand, in a case where the luminance of the video included in the video data is found to be relative-luminance managed as a result of the second determination, each of a plurality of pixels making up the video included in the video data is subjected to RGB space tone mapping, where the value of each RGB color defined in the RGB space for that pixel is reduced.

Also, in the second determining, whether or not characteristics, included in the information of ST 2086, regarding a master monitor used to generate a master video serving as a base for generation of the video data, are close to characteristics of a predetermined master monitor used to generate absolute-luminance managed video is determined. Luminance of video of the video data is determined to be absolute-luminance managed in a case of determining that the characteristics of the master monitor are close to characteristics of the predetermined master monitor (high-luminance master monitor), and luminance of video of the video data is determined to be relative-luminance managed in a case of determining that the characteristics of the master monitor are not close to characteristics of the predetermined master monitor (high-luminance master monitor).

Note that the second determining is specifically performed using the following algorithm. For example, determining is performed regarding whether or not max_display_mastering_luminance included in the information of ST 2086 is near 4000 nits, and if determination is made that max_display_mastering_luminance is near 4000 nits, the HDR contents are estimated to have been generated by a high-luminance master monitor used in the Dolby Vision format. That is to say, in the second determining, whether or not the characteristics of the master monitor are close to characteristics of the predetermined master monitor (high-luminance master monitor) is determined by determining, based on display peak luminance information (max_display_mastering_luminance) indicating a display peak luminance of the master monitor as the master monitor characteristics, whether or not the display peak luminance is a value near 4000 nits. In the second determining, luminance of video of the video data is determined to be absolute-luminance managed in a case the display peak luminance is a value near 4000 nits, and luminance of video of the video data is determined to be relative-luminance managed in a case the display peak luminance is not a value near 4000 nits.

Also, an arrangement may be made where determining is performed regarding whether or not display_primaries included in the information of ST 2086 is near the characteristics value of a high-luminance master monitor (Pulsar), and if determination is made that display_primaries is near the characteristics value of the high-luminance master monitor (Pulsar), the HDR contents are estimated to have been generated by a high-luminance master monitor used in the Dolby Vision format. That is to say, in the second determining, whether or not the characteristics of the master monitor are close to characteristics of the predetermined master monitor (high-luminance master monitor) is determined by determining, based on display primary color information (display_primaries) representing display primary color of the master monitor as the master monitor characteristics, whether or not the display primary color is a value near the display primary color of the predetermined master monitor (high-luminance master monitor). In the second determining, luminance of video of the video data is determined to be absolute-luminance managed in a case the display primary color is a value near the display primary color of the predetermined master monitor (high-luminance master monitor), and luminance of video of the video data is determined to be relative-luminance managed in a case the display primary color is not a value near the display primary color of the predetermined master monitor.

Also, an arrangement may be made where determining is performed regarding whether or not white_point included in the information of ST 2086 is near the characteristics value of the high-luminance master monitor (Pulsar), and if determination is made that white-point is near the characteristics value of the high-luminance master monitor (Pulsar), the HDR contents are estimated to have been generated by a high-luminance master monitor used in the Dolby Vision format. That is to say, in the second determining, whether or not the characteristics of the master monitor are close to characteristics of the predetermined master monitor (high-luminance master monitor) is determined by determining, based on white point information (white_point) representing a white point of the master monitor as the master monitor characteristics, whether or not the white point is a value near the white point of the predetermined master monitor (high-luminance master monitor). In the second determining, luminance of video of the video data is determined to be absolute-luminance managed in a case the white point is a value near the white point of the predetermined master monitor (high-luminance master monitor), and luminance of video of the video data is determined to be relative-luminance managed in a case the white point is not a value near the white point of the predetermined master monitor.

Also, an arrangement may be made where determining is performed regarding whether or not the display_primaries and white_point described above differ from the characteristics value of the high-luminance master monitor, and also are near to characteristics values of a standard master monitor (e.g., a SONY X300 or the like), and if determination is made that these are near the characteristics value of a standard master monitor, the HDR contents may be determined to have been graded format other than the Dolby Vision format. The number of types of HDR-capable master monitors is extremely small as compared to consumer-grade TVs, so it is possible to store a management table of HDR-capable master monitors, and update via the Internet as appropriate. Thus, storing a management table of HDR-capable master monitors enables the master monitor used for grading to be appropriately estimated, and whether or not grading was performed by the Dolby Vision format can be determined more effectively.

In addition to using information of ST 2086, the second determining may be performed using static metadata MaxCLL (The Maximum Content Light Level) and MaxFALL (The Maximum Frame-Average Light Level) defined by Blu-ray (a registered trademark) Disc Association, HDMI (a registered trademark) Forum, and UHD Alliance. Note that MaxCLL is peak luminance information indicating the HDR peak luminance of HDR content video. MaxCLL is static metadata only for HDR contents. MaxFALL is maximum frame-average luminance information indicating the maximum frame-average luminance that is the maximum value of average luminance of each of multiple frames making up the HDR video of the HDR contents. MaxFALL is static metadata only for HDR contents, and an authoring guideline has been compiled to not exceed 400 nits in the Ultra HD Blu-ray (a registered trademark) format for HDR contents.

Specifically, the second determining may be performed as follows by using MaxLCC. For example, determination may be made regarding whether or not the value of MaxCLL is 2000 nits or above, and in a case of 2000 nits or above, estimation may be made that the HDR video has been graded (absolute-luminance managed) by the Dolby Vision format, since extremely high-luminance pixel components are included. Note that 2000 nits for the determination standard is one example, and may be 3000 nits.

That is to say, in the second determining, determination is made regarding whether the peak luminance indicated by peak luminance information exceeds a second predetermined luminance (e.g., 2000 nits, 3000 nits, etc.). In the second determining, wherein luminance of video of the video data is determined to be absolute-luminance managed in a case the peak luminance exceeds the second predetermined luminance, and luminance of video of the video data is determined to be relative-luminance managed in a case the peak luminance is equal to or below the second predetermined luminance.

Also, for example, determination may be made regarding whether or not the value of MaxCLL is 1500 nits or above, and in a case of 1500 nits or above, estimation may be made that the HDR video has been graded (absolute-luminance managed) by the Dolby Vision format, since high-luminance pixel components are included. Note that 1500 nits for the determination standard is one example, and may be 1200 nits.

Also, for example, determination may be made regarding whether or not the value of MaxCLL is 1500 nits or lower, and in a case of 1500 nits or lower, estimation may be made that there is a high probability that this is not HDR video that has been graded by the Dolby Vision format but rather HDR vide that has been relative-luminance managed, since high-luminance pixel components are not included. Note that 1500 nits for the determination standard is one example, and may be 1750 nits.

Also, for example, determination may be made regarding whether or not the value of MaxCLL is 800 nits or lower, and in a case of 800 nits or lower, estimation may be made that this is not HDR video that has been graded by the Dolby Vision format (absolute-luminance managed) but rather HDR video that has been relative-luminance managed. Note that 800 nits for the determination standard is one example, and may be 750 nits or 1000 nits.

Also, a reference value may be provided regarding the value of MaxFALL, and determine in the same way as with MaxCLL. That is to say, in the second determining, whether or not the maximum frame-average luminance represented by the maximum frame-average luminance information exceeds a third predetermined luminance is determined. In the second determining, luminance of video of the video data is determined to be absolute-luminance managed in a case the maximum frame-average luminance exceeds the third predetermined luminance, and luminance of video of the video data is determined to be relative-luminance managed in a case the maximum frame-average luminance is equal to or below the third predetermined luminance.

Thus, by performing second determination using Max-CLL or MaxFALL in addition to using information of ST 2086, whether or not grading has been performed by the Dolby Vision format can be determined more effectively, and determination can be made regarding whether or not absolute-luminance managed HDR video. Accordingly, more appropriate display processing can be applied to the HDR video.

2-10. Advantages, Etc.

According to the display method of the present embodiment, HDR video of HDR contents graded by the Dolby Vision format can be identified, and also an appropriate tone mapping processing can be selected from the dual tone mapping and RGB space tone mapping described in the first embodiment, in accordance with the identification results. Accordingly, appropriate processing can be performed regardless of whether the HDR image is absolute-luminance managed or relative-luminance managed, so appropriate video can be displayed.

Other Embodiments

The present disclosure may be realized as a display device that performs the above-described display method. Note that the components of the above embodiments may be realized by dedicated hardware, or may be realized by a software program suitable for the components being executed. The components may be realized by a program executing unit such as a CPU or another processor or the like reading out and executing the software program recorded in a recording medium such as a hard disk, semiconductor memory, or the like. Software realizing the display method and so forth in the above embodiments is a program such as follows.

That is to say, the program causes a computer to execute a display method of displaying, on a display device, video of video data where luminance of video is defined by a first EOTF indicating a correlation of HDR luminance and code values. The method includes: acquiring the video data; performing, regarding each of a plurality of pixels making up the video included in the acquired video data, first determining of determining whether or not luminance of that pixel exceeds a first predetermined luminance; performing, regarding each of the plurality of pixels, dual tone mapping where luminance of that pixel is reduced by a different format in a case of the luminance of the pixel being found to exceed the first predetermined luminance as a result of the first determining, and a case of the luminance of the pixel being found to be equal to or lower than the first predetermined luminance; and displaying the video on the display device using the results of the dual tone mapping.

While a display method and display device and so forth according to one or multiple aspects of the present disclosure have been described by way of embodiments, the present disclosure is not restricted to these embodiments. Various modifications to the embodiments and combinations of components of different embodiments which are conceivable by one skilled in the art may be encompassed by one or multiple aspects without departing from the essence of the present disclosure.

The present disclosure is useful as a display method, display device, and so forth that enables luminance conversion to be easily performed for video of video data corresponding to HDR in accordance with display peak luminance, and enables change in color between before and after conversion to be suppressed.

What is claimed is:
1. A playback device comprising:
an adding unit for reading video data recorded in a recording medium and adding static metadata to the video data, the static metadata indicating whether luminance of a video of the video data is absolute-luminance managed or relative-luminance managed; and
an output unit for outputting the video data including the static metadata to a display device,
wherein being absolute-luminance managed indicates that the luminance is managed by using a real value of the luminance of the video; and
wherein being relative-luminance managed indicates that the luminance is managed by using a value obtained by quantizing the real value of the luminance of the video by floating decimal point.

2. A display device comprising:
an obtainer for obtaining video data;
a determining unit for determining whether luminance of a video of the video data is absolute-luminance managed or relative-luminance managed based on static metadata included in the video data; and
a tone mapping unit for converting the luminance of the video data based on a result of the determination performed by the determining unit,
wherein being absolute-luminance managed indicates that the luminance is managed by using a real value of the luminance of the video; and
wherein being relative-luminance managed indicates that the luminance is managed by using a value obtained by quantizing the real value of the luminance of the video by floating decimal point.

3. A playback device comprising:
a processor; and
a memory including at least one set of instructions that, when executed by the processor, cause the processor to perform operations including:
reading video data recorded in a recording medium and adding static metadata to the video data, the static metadata indicating whether luminance of a video of the video data is absolute-luminance managed or relative-luminance managed; and
outputting the video data including the static metadata to a display device,
wherein being absolute-luminance managed indicates that the luminance is managed by using a real value of the luminance of the video; and
wherein being relative-luminance managed indicates that the luminance is managed by using a value obtained by quantizing the real value of the luminance of the video by floating decimal point.

4. A display device comprising:
a processor; and
a memory including at least one set of instructions that, when executed by the processor, cause the processor to perform operations including:
obtaining video data;
determining whether luminance of a video of the video data is absolute-luminance managed or relative-luminance managed based on a static metadata included in the video data; and
converting the luminance of the video data based on a result of the determination performed in the determining,
wherein being absolute-luminance managed indicates that the luminance is managed by using a real value of the luminance of the video; and
wherein being relative-luminance managed indicates that the luminance is managed by using a value obtained by quantizing the real value of the luminance of the video by floating decimal point.

5. A playback device comprising:
an adding unit for reading video data recorded in a recording medium and adding static metadata to the video data, the static metadata indicating whether luminance of a video of the video data is absolute-luminance managed or relative-luminance managed; and
an output unit for outputting the video data including the static metadata to a display device,
wherein the static metadata is at least one of (i) display peak luminance information representing a display peak luminance of a master monitor, (ii) display primary color information representing display primary color of the master monitor, (iii) white point information representing a white point of the master monitor, (iv) peak luminance information representing peak luminance of the video, and (v) maximum frame-average luminance information representing a maximum value of average luminance of each of a plurality of frames making up the video.

6. A display device comprising:
an obtainer for obtaining video data;
a determining unit for determining whether luminance of a video of the video data is absolute-luminance managed or relative-luminance managed based on static metadata included in the video data; and
a tone mapping unit for converting the luminance of the video data based on a result of the determination performed by the determining unit,
wherein the static metadata is at least one of (i) display peak luminance information representing a display peak luminance of a master monitor, (ii) display primary color information representing display primary color of the master monitor, (iii) white point information representing a white point of the master monitor, (iv) peak luminance information representing peak luminance of the video, and (v) maximum frame-average luminance information representing a maximum value of average luminance of each of a plurality of frames making up the video.

7. A playback device comprising:
a processor; and
a memory including at least one set of instructions that, when executed by the processor, cause the processor to perform operations including:
reading video data recorded in a recording medium and adding static metadata to the video data, the static metadata indicating whether luminance of a video of the video data is absolute-luminance managed or relative-luminance managed; and
outputting the video data including the static metadata to a display device,
wherein the static metadata is at least one of (i) display peak luminance information representing a display peak luminance of a master monitor, (ii) display primary color information representing display primary color of the master monitor, (iii) white point information representing a white point of the master monitor, (iv) peak luminance information representing peak luminance of the video, and (v) maximum frame-average luminance information representing a maximum value of average luminance of each of a plurality of frames making up the video.

8. A display device comprising:
a processor; and
a memory including at least one set of instructions that, when executed by the processor, cause the processor to perform operations including:
obtaining video data;
determining whether luminance of a video of the video data is absolute-luminance managed or relative-luminance managed based on a static metadata included in the video data; and
converting the luminance of the video data based on a result of the determination performed in the determining,
wherein the static metadata is at least one of (i) display peak luminance information representing a display peak luminance of a master monitor, (ii) display primary color information representing display primary color of the master monitor, (iii) white point information representing a white point of the master monitor, (iv) peak luminance information representing peak luminance of the video, and (v) maximum frame-average luminance information representing a maximum value of average luminance of each of a plurality of frames making up the video.

* * * * *